(12) United States Patent
Sharp et al.

(10) Patent No.: US 11,673,743 B2
(45) Date of Patent: Jun. 13, 2023

(54) OBJECT HANDLING COORDINATION SYSTEM AND METHOD OF RELOCATING A TRANSPORTING VESSEL

(71) Applicant: Ocado Innovation Limited, Hatfield (GB)

(72) Inventors: David Sharp, Hatfield (GB); Joseph Zammit, Hatfield (GB); Richard Watkins, Hatfield (GB); Michael Campbell, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 512 days.

(21) Appl. No.: 16/753,626

(22) PCT Filed: Oct. 3, 2018

(86) PCT No.: PCT/EP2018/076933
§ 371 (c)(1),
(2) Date: Apr. 3, 2020

(87) PCT Pub. No.: WO2019/068778
PCT Pub. Date: Apr. 11, 2019

(65) Prior Publication Data
US 2020/0247611 A1 Aug. 6, 2020

(30) Foreign Application Priority Data
Oct. 4, 2017 (GB) ...................................... 1716201

(51) Int. Cl.
*B65G 1/04* (2006.01)
*G05B 13/02* (2006.01)
(Continued)

(52) U.S. Cl.
CPC ......... *B65G 1/0478* (2013.01); *G05B 13/027* (2013.01); *G05D 1/0221* (2013.01);
(Continued)

(58) Field of Classification Search
CPC . G05B 1/00–24/00; B65G 1/00–67/00; G05D 1/00–29/00; G06Q 1/00–50/00
(Continued)

(56) References Cited

U.S. PATENT DOCUMENTS 2,701,065 A * 2/1955 Bertel ........................ E04H 6/18
212/327
3,273,727 A 9/1966 Rogers et al.
(Continued)

FOREIGN PATENT DOCUMENTS

CN 1113205 A 12/1995
CN 1884013 A 12/2006
(Continued)

OTHER PUBLICATIONS

International Search Report (PCT/ISA/210) dated Jan. 11, 2019, by the European Patent Office as the International Searching Authority for International Application No. PCT/EP2018/076933.
(Continued)

*Primary Examiner* — Alan S Miller
(74) *Attorney, Agent, or Firm* — Buchanan Ingersoll & Rooney PC

(57) ABSTRACT

An object handling coordination system includes a plurality of transporting vessels arranged as a three-dimensional cluster of transporting vessels. The plurality of transporting vessels is addressable and the cluster has a self-reconfigurable physical topology. A relocatable transporting vessel is configured to be relocatable within the. A motion control system is configured to determine a path from a start location of the relocatable transporting vessel within the cluster to a destination location within the cluster and arranged to execute movement of the relocatable transporting vessel within the cluster using the determined path.

16 Claims, 13 Drawing Sheets

(51) Int. Cl.
*G05D 1/02* (2020.01)
*G06Q 10/047* (2023.01)
*G06Q 10/0631* (2023.01)
*G06Q 30/0204* (2023.01)
*G06Q 50/28* (2012.01)
*G06Q 50/30* (2012.01)

(52) U.S. Cl.
CPC ..... *G06Q 10/047* (2013.01); *G06Q 10/06316* (2013.01); *G06Q 30/0205* (2013.01); *G06Q 50/28* (2013.01); *G06Q 50/30* (2013.01); *G05D 2201/0216* (2013.01)

(58) Field of Classification Search
USPC ..................................................... 700/1–299
See application file for complete search history.

(56) References Cited

U.S. PATENT DOCUMENTS

| | | | | |
|---|---|---|---|---|
| 5,882,164 | A * | 3/1999 | Rapeli | B65G 63/004 414/141.4 |
| 8,725,287 | B2 | 5/2014 | Lindblom | |
| 9,205,978 | B2 * | 12/2015 | Alba | B65G 1/0407 |
| 9,515,869 | B2 | 12/2016 | Ngo | |
| 9,534,906 | B2 * | 1/2017 | High | H04N 7/18 |
| 10,086,999 | B2 * | 10/2018 | Stadie | G05D 1/0289 |
| 10,822,166 | B2 * | 11/2020 | Ingram-Tedd | B65G 1/1378 |
| 11,377,309 | B2 * | 7/2022 | Ingram-Tedd | B65G 1/065 |
| 2007/0061043 | A1 * | 3/2007 | Ermakov | G05D 1/024 700/263 |
| 2007/0293978 | A1 * | 12/2007 | Wurman | C07C 253/34 700/213 |
| 2008/0211358 | A1 * | 9/2008 | Borgwarth | B65G 1/0478 312/35 |
| 2013/0006412 | A1 * | 1/2013 | Lindblom | B65G 1/0492 700/218 |
| 2013/0034410 | A1 * | 2/2013 | Heise | G01N 35/04 414/222.13 |
| 2013/0185408 | A1 | 7/2013 | Ngo | |
| 2013/0302132 | A1 * | 11/2013 | D'Andrea | B66F 9/063 414/807 |
| 2015/0285644 | A1 * | 10/2015 | Pfaff | G01C 21/20 701/25 |
| 2016/0340125 | A1 * | 11/2016 | Møller | B65G 39/025 |
| 2017/0108522 | A1 * | 4/2017 | Baer | B65G 54/02 |
| 2017/0355489 | A1 * | 12/2017 | Moore | B65D 21/0224 |
| 2018/0075402 | A1 * | 3/2018 | Stadie | G05D 1/0255 |
| 2018/0162503 | A1 * | 6/2018 | Ingram-Tedd | B65G 1/0464 |
| 2018/0229947 | A1 * | 8/2018 | Feyrer | G03B 21/64 |
| 2018/0276606 | A1 * | 9/2018 | Stadie | G06Q 10/087 |
| 2018/0276607 | A1 * | 9/2018 | Stadie | B65G 1/137 |
| 2018/0276608 | A1 * | 9/2018 | Stadie | B65G 1/0464 |
| 2019/0018027 | A1 * | 1/2019 | Hoehnel | G01N 35/00722 |
| 2019/0152724 | A1 * | 5/2019 | Philipp | G01G 19/00 |
| 2020/0247611 | A1 | 8/2020 | Sharp et al. | |
| 2020/0324971 | A1 * | 10/2020 | Ingram-Tedd | B65G 1/1371 |
| 2020/0407160 | A1 * | 12/2020 | Ingram-Tedd | B65G 1/1378 |

FOREIGN PATENT DOCUMENTS

| | | | |
|---|---|---|---|
| CN | 102803100 | A | 11/2012 |
| CN | 104169881 | A | 11/2014 |
| CN | 104386400 | A | 3/2015 |
| CN | 106662874 | A | 5/2017 |
| DE | 19925157 | A1 | 1/2001 |
| EP | 0767113 | B1 | 7/2002 |
| EP | 1037828 | B2 | 9/2003 |
| EP | 3692427 | A1 | 8/2020 |
| GB | 2520104 | A | 5/2015 |
| GB | 201716201 | | 11/2017 |
| JP | S 61-104985 | A | 5/1986 |
| JP | S63310462 | A | 12/1988 |
| JP | H 4-105007 | U | 9/1992 |
| JP | H04105007 | U | 9/1992 |
| JP | H0664747 | U | 8/1994 |
| JP | H 06211306 | A | 8/1994 |
| JP | 2557985 | Y2 | 12/1997 |
| JP | 2016-141323 | A | 8/2016 |
| JP | 2016160040 | A | 9/2016 |
| JP | 2017-518940 | A | 7/2017 |
| JP | 2018-520965 | A | 8/2018 |
| KR | 101085124 | B1 | 11/2011 |
| KR | 20170013973 | A | 2/2017 |
| NO | 317366 | B1 | 10/2004 |
| WO | 2015185628 | A2 | 12/2015 |
| WO | WO-2015185628 | A2 * | 12/2015 ............. B60L 58/12 |
| WO | 2016166294 | A1 | 10/2016 |
| WO | 2017129384 | A1 | 8/2017 |
| WO | 2017144054 | A1 | 8/2017 |
| WO | 2019068778 | A1 | 4/2019 |

OTHER PUBLICATIONS

Written Opinion (PCT/ISA/237) dated Jan. 11, 2019, by the European Patent Office as the International Searching Authority for International Application No. PCT/EP2018/076933.
Preliminary Office Action dated Aug. 9, 2022, by the Brazilian Patent Office in corresponding Brazilian Patent Application No. BR112020006803-9, and a partial English Translation of the Office Action (6 pages).
Office Action (Examination Report) dated Dec. 2, 2021, by the Great Britain Patent Office in corresponding Great Britain Patent Application No. GB1816154.7. (7 pages).
Office Action dated Dec. 13, 2021, U.S. Appl. No. 16/753,656.
Office Action dated Oct. 20, 2021, by the Chinese Patent Office in corresponding Chinese Patent Application Mo. 201880078465.5, and an English Translation of the Office Action. (17 pages).
Office Action (Notification of Reason for Refusal) dated Dec. 27, 2021, by the Korean Patent Office in corresponding Korean Patent Application No. 10-2020-7010513, and an English Translation of the Office Action. (10 pages).
First Office Action dated Mar. 25, 2021, by the Chinese Patent Office in corresponding Chinese Patent Application No. 201880078465.5, and an English Translation of the Office Action. (34 pages).
Office Action (Examination Report) dated Mar. 23, 2021, by the Great Britain Patent Office in corresponding Great Britain Patent Application No. GB1816154.7. (2 pages).
First Office Action dated Jun. 22, 2021, by the Japanese Patent Office in Japanese Patent Application No. 2020-519304, and an English Translation of the Office Action. (12 pages).
Office Action (Notification of Reason for Refusal) dated Jun. 10, 2021, by the Korean Patent Office in Korean Patent Application No. 10-2020-7012079, and an English Translation of the Office Action. (31 pages).
Office Action (Notification of Reason for Refusal) dated Jun. 24, 2021, by the Korean Patent Office in Korean Patent Application No. 10-2020-7010513, and an English Translation of the Office Action. (6 pages).
Office Action (Decision of Rejection) dated Jan. 25, 2022, by the Japanese Patent Office in corresponding Japanese Patent Application No. 2020-519409, and an English Translation of the Office Action. (7 pages).
Office Action dated May 31, 2021, by the Canadian Patent Office in corresponding Canadian Patent Application No. 3,077,121. (4 pages).
First Office Action dated Jun. 22, 2021, by the Japanese Patent Office in corresponding Japanese Patent Application No. 2020-519409, and an English Translation of the Office Action. (13 pages).
First Office Action dated Feb. 22, 2022, by the Japanese Patent Office in corresponding Japanese Patent Application No. 2020-519304, and an English Translation of the Office Action. (12 pages).
Office Action dated Jul. 5, 2022, 2022, by the Great Britain Patent Office in corresponding Great Britain Patent Application No. GB1816154.7. (3 pages).
Office Action dated Jun. 23, 2022, by the Canadian Patent Office in corresponding Canadian Patent Application No. 3,077,121. (4 pages).
Notice of Allowance dated Apr. 12, 2022, U.S. Appl. No. 16/753,656.

(56) References Cited

OTHER PUBLICATIONS

International Search Report and Written Opinion issued in International Patent Application No. PCT/EP2018/076928, 20 pages (dated Jan. 22, 2019).
The Examiner's attention is directed to co-pending U.S. application, U.S. Appl. No. 16/753,656, filed Apr. 3, 2020.
Office Action (Communication) dated Jul. 18, 2022, by the European Patent Office in corresponding European Patent Application No. 18 782 426.3. (5 pages).
Office Action (Communication pursuant to Article 94(3) EPC) dated Sep. 6, 2021, by the European Patent Office in corresponding European Patent Application No. 18 782 426.3-1202. (4 pages).
Office Action dated Feb. 28, 2023, by the Chinese Patent Office in corresponding Chinese Patent Application Mo. 201880065101.3, and a machine English Translation of the Office Action. (47 pages).

\* cited by examiner

OBJECT HANDLING COORDINATION SYSTEM AND METHOD OF RELOCATING A TRANSPORTING VESSEL

This application claims priority from UK Patent Application No. 1716201.7 filed 4 Oct. 2017, the content of all of this application hereby being incorporated by reference.

The present invention relates to an object handling coordination system of the type that, for example, coordinates traversal of a relocatable transporting vessel through a cluster of transporting vessels. The present invention also relates to a method of relocating a transporting vessel, the method being of the type that, for example, coordinates traversal of a relocatable transporting vessel through a cluster of transporting vessels.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins are removed from the stacks and accessed from above by load handling devices, removing the need for aisles between the rows and allowing more containers to be stored in a given space. Methods of handling containers stacked in rows have been well known for decades. In some such systems, for example as described in U.S. Pat. No. 2,701,065 (Bertel), free-standing stacks of containers are arranged in rows in order to reduce the storage volume associated with storing such containers, but yet still providing access to a specific container if required. Access to a given container is made possible by providing relatively complicated hoisting mechanisms that can be used to stack and remove given containers from stacks. The costs of such systems are, however, impractical in many situations and they have mainly been commercialised for the storage and handling of large shipping containers. The concept of using freestanding stacks of containers and providing a mechanism to retrieve and store specific containers has been developed further, for example as described in European patent no. 0 767 113 (Cimcorp). This document discloses a mechanism for removing a plurality of stacked containers, using a robotic load handler in the form of a rectangular tube that is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product. Such stacks are known as a single-product stacks. In the system described in European patent no. 0 767 113, the height of the tube has to be at least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler above the stack.

European patent no. 1037828 (Autostore) describes a system in which stacks of containers are arranged within a frame structure. Robotic load handling devices can be controllably moved around the stack on a system of tracks on the uppermost surface of the stack. Other forms of robotic load handling device are further described in, for example, Norwegian patent number 3 173 66.

UK patent publication no. 2 520 104 (Ocado Innovation Limited) discloses a load handling device where each robotic load handler only covers one grid space, thus allowing higher density of load handlers and thus higher throughput of a given size system. However, any suitable form of load handling device can be used.

However, each of the known robotic picking systems described above possess one or more of the following drawbacks. In all examples, a peripheral frame structure is required, including a grid on an uppermost part of the frame structure to support robotic load handlers traversing on top of the frame structure above the stacks of storage bins. The robotic load handlers also have to "dig" down into a stack of storage bins in order to retrieve a selected storage bin, which represents a time and energy overhead when retrieving a storage bin. It also follows that the systems described above require robotic load handlers, which represent an additional cost of the system.

Furthermore, when coordinating such a system, positive progress by a robotic load hander from a start location to a destination location typically requires the robotic load handler to undertake a number of unnecessary, unproductive and or costly steps. Also, when a storage bin becomes stuck in a stack of storage bins, it is difficult to recover storage bins beneath the stuck storage bin. Similarly, when a robotic load handler breaks down, access to storage bins below the robotic load handler is lost until the robotic load handler is recovered and therefore removed from its location above the stack of storage bins in question.

"Cooperative pathfinding" (Silver, D., 2005, "Cooperative pathfinding", Young, R. M., and Laird, J. E., eds., AIIDE, 117-122. AAAI Press) discloses algorithms solving the so-called multi-agent path planning problem, where agents need to find non-colliding routes to separate destinations, given full information about the routes of other agents. The algorithms are suitable for use in Real-Time Strategy games and other real-time environments. The algorithms proposed assume that a grid represents space, and use the so-called Manhattan distance as the basis for calculating a cost function. However, this technique is not scalable and does not take into account velocities, accelerations and/or kinematics, but does allows agents to cooperate.

"Optimal route re-planning for mobile robots: a massively parallel incremental A* algorithm" (Tao, et al., IEEE Proceedings of International Conference on Robotics and Automation, 1997, pp. 2727-2732) describes a massively parallel incremental A* algorithm where a terrain is modelled based on a uniform grid of squares, where each grid square is mapped to a node in a mesh. Crossing from one square to each neighbouring square is modelled as a directional arc. Each arc has a cost associated with it. The algorithm for a mesh of nodes computes all optimal paths or routes to a goal node by first computing the optimal cost of the goal for each node in the mesh. All paths to the goal are then represented as an exhaustive policy that maps each node in the mesh to a set of edges that when taken from this node lie on the optimal path. However, the massively parallel A* algorithm only considers a single mobile robot and so does not contemplate a cooperation between mobile robots. Additionally, this does not take into account the velocity, acceleration or direction change penalties. Also, the massively parallel A* algorithm disclosed in this document is not efficient at modelling kinematics.

According to a first aspect of the present invention, there is provided an object handling coordination system comprising: a plurality of transporting vessels arranged as a three-dimensional cluster of transporting vessels, the plurality of transporting vessels being respectively addressable and the cluster having a self-reconfigurable physical topology; a relocatable transporting vessel of the plurality of transporting vessels arranged to be relocatable within the cluster in response to an instruction; and a processing resource arranged to support a motion control system; wherein the motion control system is arranged to determine a path from a start location of the relocatable transporting vessel within the cluster to a destination location within the cluster; and the motion control system is arranged to execute movement of the relocatable transporting vessel within the cluster using the determined path.

The motion control system may be arranged to address a number of the plurality of the transporting vessels and provide respective instructions thereto in order to affect translation of the relocatable transporting vessel within the cluster in accordance with the determined path.

The number of the plurality of transporting vessels may comprise the relocatable transporting vessel.

The relocatable transporting vessel may be arranged to translate laterally within the cluster.

The motion control system may be arranged to calculate the path between the start location and the destination location so as to satisfy a predetermined metric.

The metric may be a cost function.

Each of the plurality of transporting vessels may be independently addressable. The plurality of transporting vessels may be arranged to receive respectively a motion control instruction.

The relocatable transporting vessel may be driven from within the cluster.

Determination of the path may comprise the motion control system determining an internal physical sub-topology of the cluster to support the translation of the relocatable transporting vessel.

The motion control system may be arranged to identify a set of the plurality of transporting vessels to arrange to provide the internal physical sub-topology of the cluster.

The motion control system may be arranged to determine a sequence of moves of the set of the plurality of transporting vessels in order to provide the internal physical sub-topology.

The motion control system may be arranged to instruct the set of the plurality of transporting vessels in order to execute the sequence of moves.

The relocatable transporting vessel may be arranged to move relative to the number of the plurality of transporting vessels within the cluster.

The number of the transporting vessels may be arranged to cooperate with the relocatable transporting vessel in order to facilitate controlled translation of the relocatable transporting vessel within the cluster.

The plurality of transporting vessels may be a plurality of transporting devices.

The plurality of transporting vessels may be a plurality of containers.

The relocatable transporting vessels may comprise a communications device to support the addressability of the relocatable transporting vessel.

The plurality of transporting vessels may comprise a respective plurality of communications devices to support the respective addressability of the plurality of transporting vessels.

The system may further comprise: another relocatable transporting vessel of the plurality of transporting vessels arranged to be relocatable within the cluster in response to another instruction; wherein the motion control system may be arranged to determine another path from another start location of the another relocatable transporting vessel within the cluster to another destination location within the cluster; and the motion control system may be arranged to execute movement of the another relocatable transporting vessel within the cluster using the determined another path.

The system may further comprise: a pick station disposed adjacent the cluster and operably in communication with the cluster.

The system may further comprise: a decant station disposed adjacent the cluster and operably in communication with the cluster.

The system may further comprise: a tote load and/or tote unload station disposed adjacent the cluster and operably in communication with the cluster for inserting a tote into the relocatable transporting vessel and/or removal of the tote from the relocatable transporting vessel.

The plurality of transporting vessels may comprise transporting vessels of different sizes.

The motion control system may be arranged to subdivide notionally the cluster into regions of transporting vessels.

The motion control system may be arranged to determine whether the start location and the destination location coexist in a same region.

The motion control system may be arranged to select a number of neighbouring regions with respect to the region comprising the start location and to calculate a respective cost associated with translation of the relocatable transporting vessel into each neighbouring region.

Each neighbouring region may comprise a plurality of border locations with the region comprising the start location; and the motion control system may be arranged to determine a cost respectively associated with the relocatable transporting vessel entering into the each neighbouring region via each of the respective plurality of border locations.

The motion control system may be arranged to select one of the plurality of border locations as a waypoint in response to a cost assessment and to determine an initial path from the start location to the waypoint.

The motion control system may be arranged to execute movement of the relocatable transporting vessel within the cluster using the determined initial path to the waypoint in response to determining that the neighbouring cluster is ready to receive the relocatable transporting vessel.

The motion control system may be arranged to determine a plurality of sequences of states in respect of at least part of the cluster and corresponding to a tree of states having a predetermined depth.

The motion control system may be arranged to analyse the plurality of sequences of states and to calculate a cost in respect of each sequence of states of the plurality of sequence of states.

The motion control system may be arranged to analyse the costs respectively in respect of each of the sequence of states and to select an acceptably convenient sequence of states defined by a cost function.

The motion control system may be arranged to apply a heuristic algorithm in order to calculate the costs.

The motion control system may be arranged to employ a reinforcement learning technique to determine the acceptably convenient sequence of states.

The motion control system may be arranged to employ a supervised learning technique to calculate costs.

According to a second aspect of the invention, there is provided a warehouse comprising the object handling coordination system as set forth above in relation to the first aspect of the invention.

According to a third aspect of the invention, there is provided a vehicle comprising the object handling coordination system as set forth above in relation to the first aspect of the invention.

According to a fourth aspect of the invention, there is provided a zero-gravity or low-gravity environment comprising the object handling coordination system as set forth above in relation to the first aspect of the invention.

According to a fifth aspect of the invention, there is provided a method of relocating a transporting vessel within a plurality of transporting vessels arranged as a three-dimensional cluster of transporting vessels, the plurality of transporting vessels being respectively addressable and the cluster having a self-reconfigurable physical topology, the method comprising: a motion control system determining a path from a start location of a relocatable transporting vessel within the cluster to a destination location within the cluster; the motion control system executing movement of the relocatable transporting vessel within the cluster using the determined path.

According to a sixth aspect of the invention, there is provided a computer program element comprising computer program code means to make a computer execute the method as set forth above in relation to the fifth aspect of the invention.

According to a seventh aspect of the invention, there is provided a subterranean transportation system comprising: an object handling coordination system located at a start location and a receiving system located at a destination location, the object handling coordination system comprising: a plurality of transporting vessels arranged as a three-dimensional cluster of transporting vessels, the plurality of transporting vessels being respectively addressable and the cluster having a self-reconfigurable physical topology; a relocatable transporting vessel of the plurality of transporting vessels arranged to be relocatable within the cluster in response to an instruction; a processing resource arranged to support a motion control system; and a conduit network for transporting the relocatable transporting vessel, the conduit network having a first port at the start location in order to provide access to the object handling coordination system and a second port at the destination location in order to provide access to the receiving system; wherein the motion control system is arranged to convey the relocatable transporting vessel into the conduit network via the first port.

The conduit network may comprise a locomotion system arranged to convey the relocatable transporting vessel to the destination location.

The relocatable transporting vessel may be disposed at an internal start location within the cluster; the motion control system may be arranged to determine a path from the internal start location to an internal destination location adjacent the first port; and the motion control system may be arranged to execute movement of the relocatable transporting vessel within the cluster using the determined path.

The cluster may be superterranean. The receiving system may be superterranean.

The cluster may be arranged to receive the relocatable transporting vessel from the conduit network via the first port.

The receiving system may be arranged to introduce the relocatable transporting vessel into the conduit network.

According to an eighth aspect of the invention, there is provided a method of configuring an object handling coordination system that comprises: a plurality of logically relocatable elements arranged to emulate a three-dimensional cluster of a plurality of logical transporting vessels of a density determined by a number of vacant locations amongst the plurality of logical transporting vessels, the cluster having a reconfigurable topology; and a motion control system comprising a routing agent, the method comprising: the routing agent determining a relocation path of a logically relocatable element of the plurality of logically relocatable elements in order to relocate the logically relocatable element from a start location within the cluster to a destination location within the cluster; and training the routing agent in accordance with a reinforcement learning technique.

Training the routing agent may comprise: selecting a required number of logical transporting vessels of the cluster; and selecting a required density of the cluster.

The method may further comprise: executing a training simulation comprising an input cluster structure and an input density.

The density of the cluster of the training simulation may be set to a maximum density. The maximum density may be where the number of vacant locations may be zero.

The method may further comprise: selecting at random a number of logical transporting vessels to be removed from the cluster to achieve the input density of the cluster.

Training may further comprise: selecting a number of logical transporting vessels of the input cluster structure at random and assigning a number of random destinations respectively to the selected number of logical transporting vessels.

The agent may generate a sequence of relocations of a number of logically relocatable elements of the plurality of logically relocatable elements in order to attempt to relocate the number of logical transporting vessels selected at random to the number of random destinations respectively assigned.

The method may comprise training the agent by reinforcement learning using the sequence of relocations generated.

The method may further comprise: the agent generating a plurality of sequences of relocations comprising the sequence of relocations.

The method may comprise training the agent by reinforcement learning using the plurality of sequences of relocations generated.

The method may further comprise: providing a convolutional neural network and applying the reinforcement learning technique to the convolutional neural network.

Generating the sequence of relocations may further comprise: selecting a logically relocatable element of the number of logically relocatable elements and determining an action in respect of the selected logically relocatable element.

Generating the sequence of relocations may further comprise: determining a plurality of actions in respect of the number of logically relocatable elements.

The number of logically relocatable elements may be a number of vacant locations of the cluster that are relocatable.

Training the routing agent may further comprise: selecting an initial structure of the cluster comprising a predetermined initial number of logical transporting vessels of the plurality of logical transporting vessels that is less than the desired number of logical transporting vessels, and an initial density of the cluster; and the input cluster structure may comprises the predetermined initial number of logical transporting vessels and the input density may be the initial density of the cluster.

The method may further comprise: modifying the input cluster structure and the input density and performing the training simulation in respect of the modified input cluster structure and input density.

The method may further comprise: repeatedly modifying the input cluster structure and the input density until the input cluster structure comprises the desired number of logical transporting vessels and the desired density of the cluster.

According to a ninth aspect of the invention, there is provided an object handling coordination system comprising: a plurality of transporting vessels arranged as a three-dimensional cluster of transporting vessels, the plurality of transporting vessels being respectively addressable and the cluster having a self-reconfigurable physical topology; a relocatable transporting vessel of the plurality of transporting vessels arranged to be relocatable within the cluster in response to an instruction; and a processing resource arranged to support a motion control system as set forth above in relation to the eighth aspect of the invention; wherein the agent of the motion control system is arranged to determine a path from a start location of the relocatable transporting vessel within the cluster to a destination location within the cluster; and the motion control system is arranged to execute movement of the relocatable transporting vessel within the cluster using the determined path.

According to a tenth aspect of the invention, there is provided an object handling coordination system comprising: a plurality of transporting vessels arranged as a three-dimensional cluster of transporting vessels, the plurality of transporting vessels being respectively addressable and the cluster having a self-reconfigurable physical topology; a relocatable transporting vessel of the plurality of transporting vessels arranged to be relocatable within the cluster in response to an instruction; and a processing resource arranged to support a motion control system; wherein the motion control system is arranged to provide, when in use, a circulating flow of transporting vessels in the cluster, the circulating flow comprising a flow path; the motion control system is arranged to determine a path from a start location of the relocatable transporting vessel within the cluster to a destination location within the cluster, the path determined comprising at least part of the flow path of the circulating flow of transporting vessels; and the motion control system is arranged to execute movement of the relocatable transporting vessel within the cluster using the determined path.

It is thus possible to provide a system and method that is scalable to support the cluster comprising a large number of transporting vessels. The need for robotic load handlers traversing a grid above a frame structure is avoided along with associated time penalties and expenses. Indeed, the speed and efficiency of the system is greater than existing systems. Additionally, the system and method mitigate access problems where a transporting vessel becomes stuck. Furthermore, collisions of load handling devices are obviated and the system and method support the ejection of faulty transporting vessels from the cluster. The method of configuring an object handling system also provides a scalable method of training a motion control system. Use of a reinforcement learning technique in conjunction with a simplified data structure and a simplified manner of representing the problem of relocating transporting vessels within the cluster permits the motion control system to transfer training acquired from simple routing problems involving a relatively small number of transporting vessels to complex routing problems involving a large number of transporting vessels. Furthermore, the number of parameters in a convolutional layer in the convolutional neural network employed is independent of the size of the input tensors. Additionally, by using convolutions invariance to translations and small mutations of the relocation problem being addressed can be built into the agent, thereby permitting a convolution trained in respect of a first portion of a cluster to be applied to a second portion of the cluster without needing the second portion of the cluster to possess the same structure and destination tuple as the first portion of the cluster.

At least one embodiment of the invention will now be described, by way of example only, with reference to the accompanying drawings, in which.

Throughout the following description, identical reference numerals will be used to identify like parts.

Figure 1:
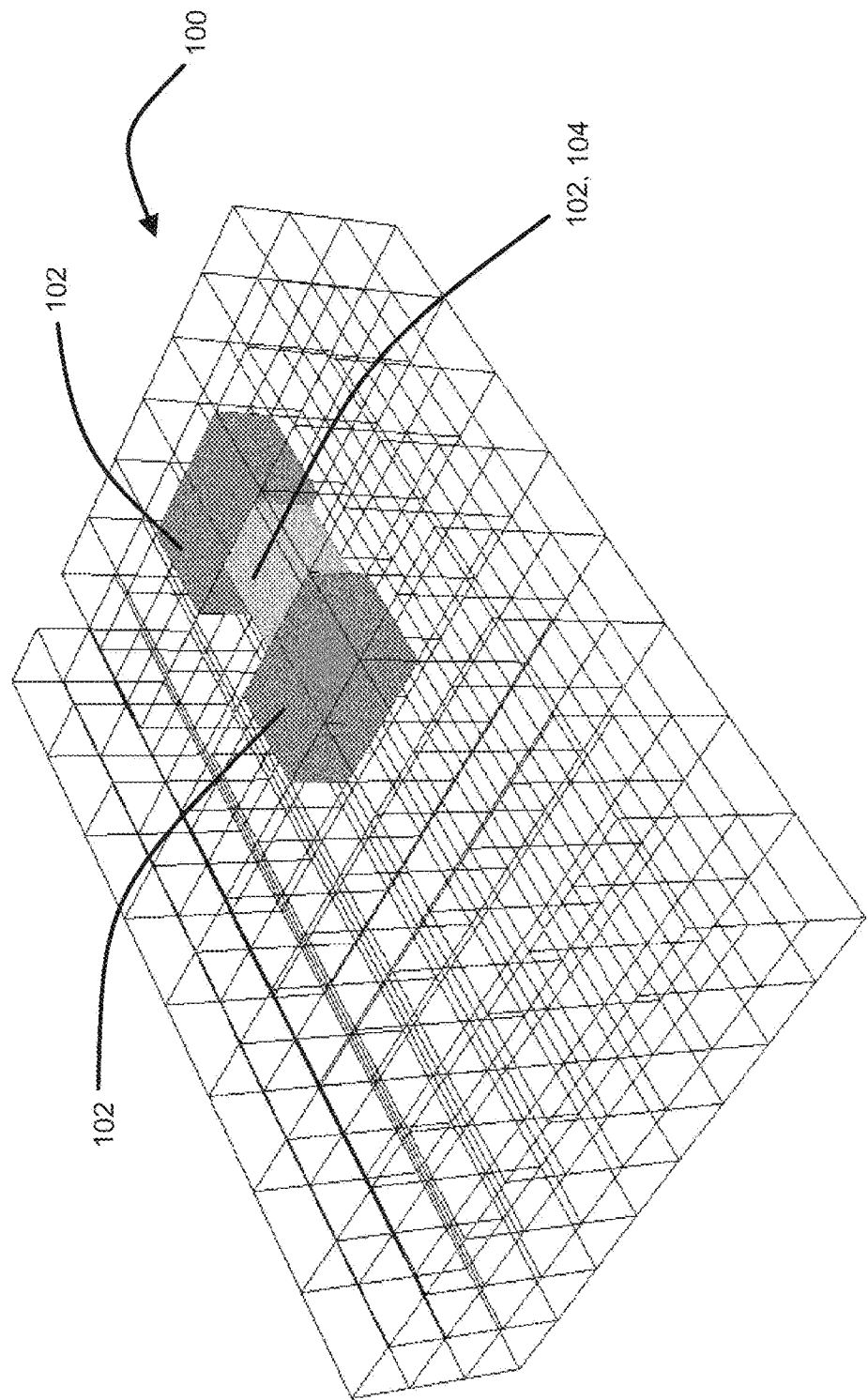
FIG. 1 is a schematic diagram of a cluster of an object handling coordination system in a first state and constituting an embodiment of the invention.

Referring to FIG. 1, an object handling coordination system a cluster 100 of transporting vessels comprises a plurality of transporting vessels 102. In this example, the plurality of transporting vessels 102 is a plurality of transporting devices, such as containers. In this regard, each transporting vessel of the plurality of transporting vessels 102 is relocatable, i.e. capable of mobility, laterally and vertically, i.e. in three directions, for example an x-direction, a y-direction and a z-direction. The drive principle to relocate a given transporting vessel is by way of physical translation provided within the cluster. The mobility can be provided in any suitable manner, for example, mechanical, electromechanical or magnetic techniques or any suitable combination thereof, for example as set forth in copending UK patent application number GB1716204.1 filed on 4 Oct. 2017 (Ocado Innovation Limited Reference Number 000113 GB), the contents of which are hereby incorporated in their entirety by reference. In this cross-referenced document, a transporting vessel 102 is referred to as a transporting device and it is envisaged that such terms may be used interchangeably.

The cluster 100 is a three-dimensional cluster, in this example, of a uniform shape. However, the skilled person should appreciate that any suitable shape can be assumed by the cluster depending upon implementation preferences. Additionally or alternatively, it should be appreciated that the transporting vessels 102 can be used to hold many different goods. Indeed, each transporting vessel 100 can contain different goods within a single row or column of transporting vessels 102. Furthermore, it should be appreciated that the storage vessels 102 can be empty whilst stored in the cluster or can contain items such as parcels or other items for future delivery.

The cluster 100 comprising the plurality of transporting vessels 102 comprises spaces or can provide spaces therein to allow reorganisation of a number of the transporting vessels 102 in order to allow one or more transporting vessels 102 to relocate from a respective start location within the cluster 100 to a respective destination location within the cluster 100. In this regard, the plurality of transporting vessels 102 of the cluster 100 is respectively addressable, for example independently addressable, so that the cluster has a self-reconfigurable physical topology. It should be appreciated that the addressability of each of the transporting vessels 102 is distinct from physically accessing the transporting vessels 102. Addressability is intended to refer to having an addressing scheme usable to send one or more instructions, for example motion control instructions, to individual transporting vessels 102 or groups of transporting vessels 102 in order to achieve translation of one or more transporting vessels 102 so as to relocate the one or more transporting vessels 102.

In order to coordinate translation of the storage vessels 102 across the grid, a suitably configured computing device is provided along with associated communications networks, devices, software and firmware to provide a platform for enabling one or more embodiments as described herein.

Figure 2:
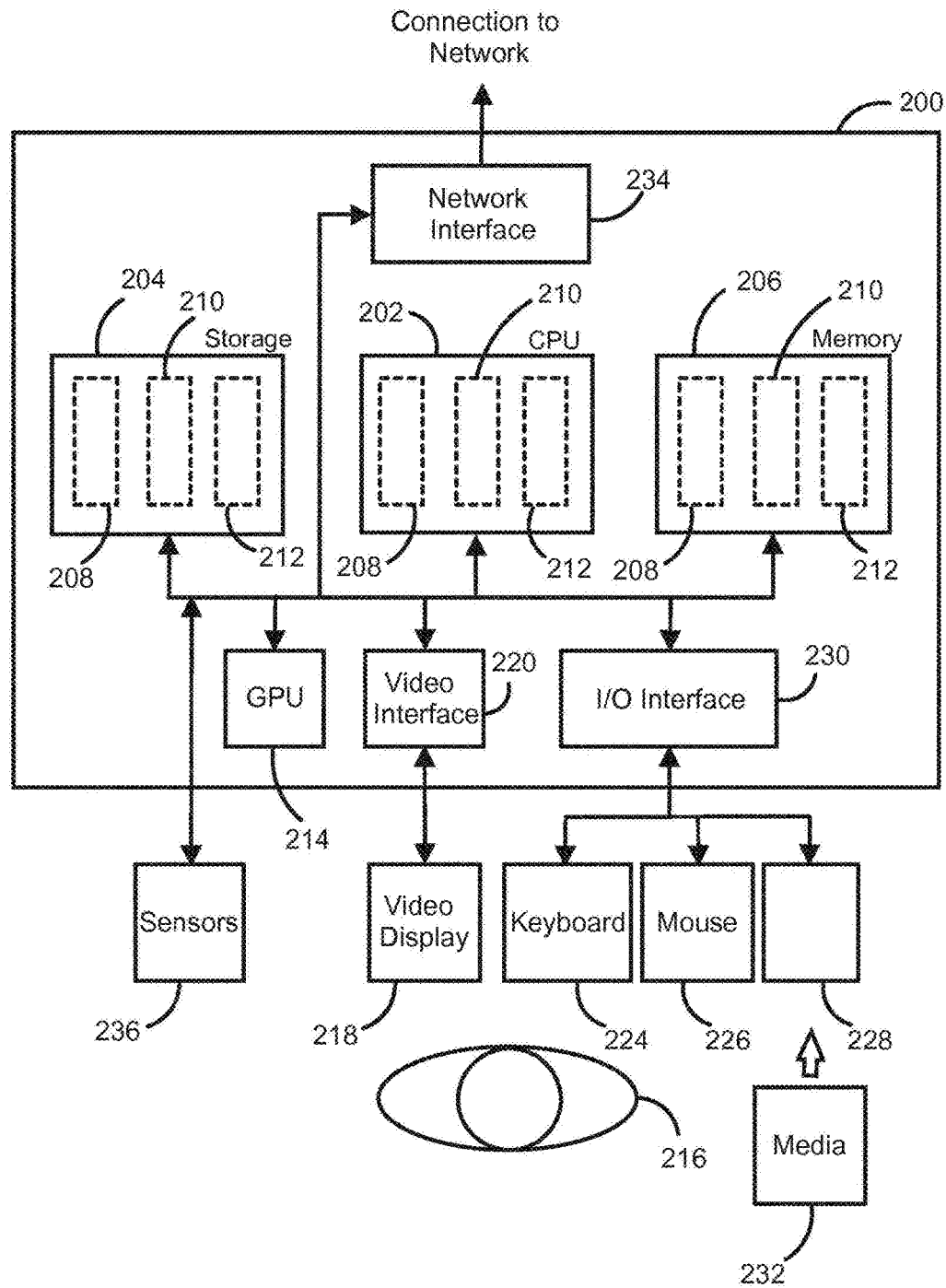
FIG. 2 is a schematic diagram of an object handling coordination system constituting an embodiment of the invention.

Turning to FIG. 2, a computing device 200 comprises, for example, a processing resource, such as a central processing unit ("CPU") 202 operably coupled to a storage unit 204, such as one or more hard disc drives or solid state drives, and to a memory unit 206 comprising, for example a digital memory and a Random Access Memory (RAM). The CPU 202 supports an operating system 208 and an application program 210, and handles data 212. The operating system 208, application program 210, and data 212 are stored, in this example, in the storage unit 204 and loaded into the memory unit 206, as required. The computing device 200 further includes, in this example, a graphics processing unit (GPU) 214, which is operatively coupled to the CPU 202 and to the memory unit 206 to offload intensive processing calculations, for example image processing and/or machine learning, training and/or inference, from the CPU 202 and run these calculations in parallel with the CPU 202. An operator 216 can interact with the computing device 200 using a display device 218 operably coupled via a video interface 220 to a bus 222 that is operably coupled to the CPU 202, the storage unit 204 and the memory unit 206. The operator 216 can also interact with the computing device 200 via various input/output devices, such as a keyboard 224, a mouse 226, and a removable media connector, such as a Universal Serial Bus port 228 coupled to the bus 222 via an Input/Output (I/O) interface 230. The computing device 200 can form part of a network via a network interface 234, allowing the computing device 200 to communicate with other suitably configured data processing systems (not shown). One or more different types of sensors 236 can be used to receive input from various sources.

Figure 3:
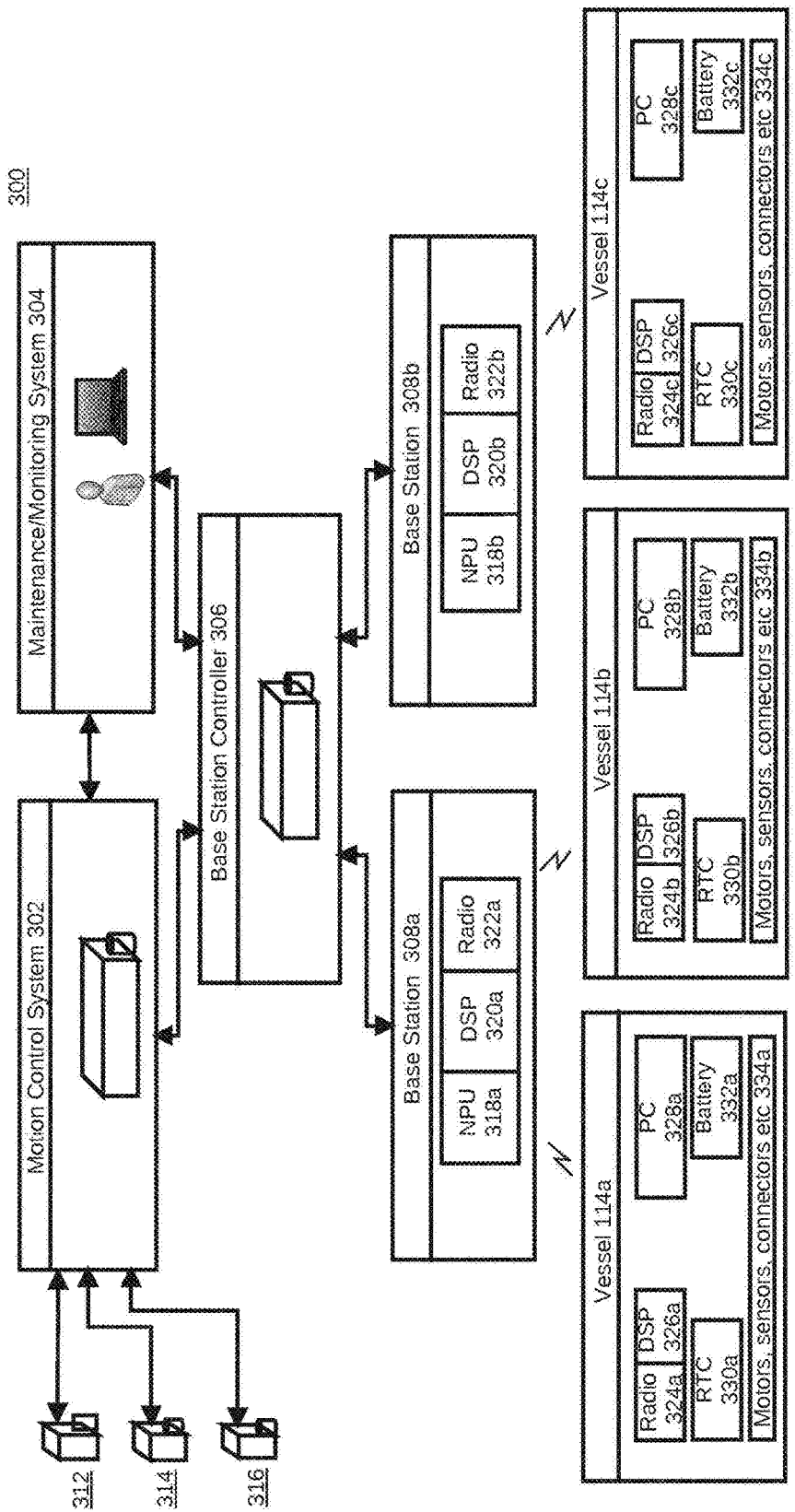
FIG. 3 is a schematic diagram of functional modules supported by the object handling system of FIG. 2 and constituting another embodiment of the invention.

Referring to FIG. 3, a high level exemplary implementation of a fully-/semi-automatic goods storage and retrieval systems 300 constituting a processing resource will now be described. However, the skilled person should appreciate that various implementations of the system 300 can employ more or less components than described herein.

The system 300 comprises a motion control system 302, a maintenance/monitoring system 304, a base station controller 306, one or more base stations 308a and 308b, one or more transporting vessels 102a, 102b and 102c. While only two base stations 308a and 308b, and three transporting vessels 102a, 102b and 102c are described above, it should be understood that that the system 300 can comprise more transporting vessels 102 and base stations in other embodiments of the system. However, in some examples, it should be appreciated that Radio Frequency (RF) based communications systems may be replaced or supplemented by other communications systems in order to facilitate scaling of the system 300, for example an optical communications system.

In this example, the system 300 also comprises one or more warehouse management systems (WMS) 312, order management systems 314 and one or more information management systems 316, respectively operably coupled to the motion control system 302. The warehouse management systems 312 stores information, for example, items required for an order, SKU #s in the warehouse, expected/predicted orders, items missing on orders, when an order is to be loaded on a transporter, expiry dates on items, what items are in which transporting vessel, and/or whether items are fragile or big and bulky.

The motion control system 302 is configured, in this example, to control the navigation/routing of transporting vessels 102, including, but not limited to, moving from one location to another, collision avoidance, optimisation of movement paths, and/or control of activities to be performed. The motion control system 302 is implemented, in this example, using one or more servers, each containing one or more processors configured based upon instructions stored upon one or more non-transitory computer-readable storage media. The motion control system 302 is configured to send control messages to one or more transporting vessels 102, receive one or more updates from one or more transporting vessels, and communicate with one or more transporting vessels using a real or near-real time protocol. The motion control system 302 receives information indicating transporting vessel location and availability from one or more base stations 308a and 308b. The motion control system 302 is configured to keep track of the number of transporting vessels available, the status of one or more transporting vessels, the location of one or more transporting vessels and/or their current instruction sets. The motion control system 302 is be configured, in this example, to process and/or send control messages to the one or more transporting vessels in anticipation of future movements, potentially reducing the processor load, and also proactively managing the traffic load with respect to the communications links. Such an implementation could be advantageous in light of complex algorithms in use by the motion control system 302 in determining optimal pathways, calculating optimal locations for transporting vessels and/or determining reservations and/or clearances.

The maintenance/monitoring system (MMS) 304 is configured, in this example, to provide monitoring functions, including receiving alerts from one or more transporting vessels 102 or one or more base stations 308a, 308b, establishing connections to query transporting vessels 102. The MMS 304 also comprises an interface (not shown) for the configuration of monitoring functions. The MMS 304 interacts with the motion control system 302 to indicate when certain transporting vessels 102 should be recalled.

The base station controller 306 stores master routing information to map transporting vessels, base stations, and grids. In some examples, one base station controller 206 is provided per environment hosting the cluster 100, for example warehouse, but in other examples, a plurality of base station controllers can be employed. The base station controller 306 is designed to provide high availability. The base station controller 306 is configured to manage dynamic frequency selection and frequency allocation of the one or more base stations 308a and 308b.

The base stations 308a and 308b are, in this example, organised as a pool of base stations, which can then be configured to be active, on standby or to monitor the system. Messages can be routed through a variety of communications apparatus to/from transporting vessels. The communications apparatus can be any suitable communications apparatus. In some examples, the communications apparatus can support an RF link, such as those falling under the 802.11 family of wireless standards. The base stations 308a and 308b comprise, in this example, processing units 318a, 318b, digital signal processors 320a, 320b, and radios 322a, 322b.

The one or more transporting vessels 102a, 102b, 102c are configured to move around the cluster 100 and to perform operations. Operations, in this example, include moving a transporting vessel from one location within the cluster 100 to another. The one or more transporting vessels 102a, 102b, 102c are assigned to communicate with the one or more base stations 308a and 308b. The one or more transporting vessels 102a, 102b, 102c are not necessarily all of the same type of transporting vessel. In this respect, the system 300 can comprise different robotic devices, for example transporting vessels, with various shapes, designs and purposes, for example, transporting vessels can vary in dimensions and volumes occupied.

In this example, the transporting vessels 102a, 102b, 102c have, respectively, radios 324a, 324b, 324c, digital signal processors 326a, 326b, 326c, processors 328a, 328b, 328c, real time controllers 330a, 330b, 330c, batteries 332a, 332b, 332c and motors, magnets, sensors, and/or connectors 334a, 334b, 334c.

Figure 4:
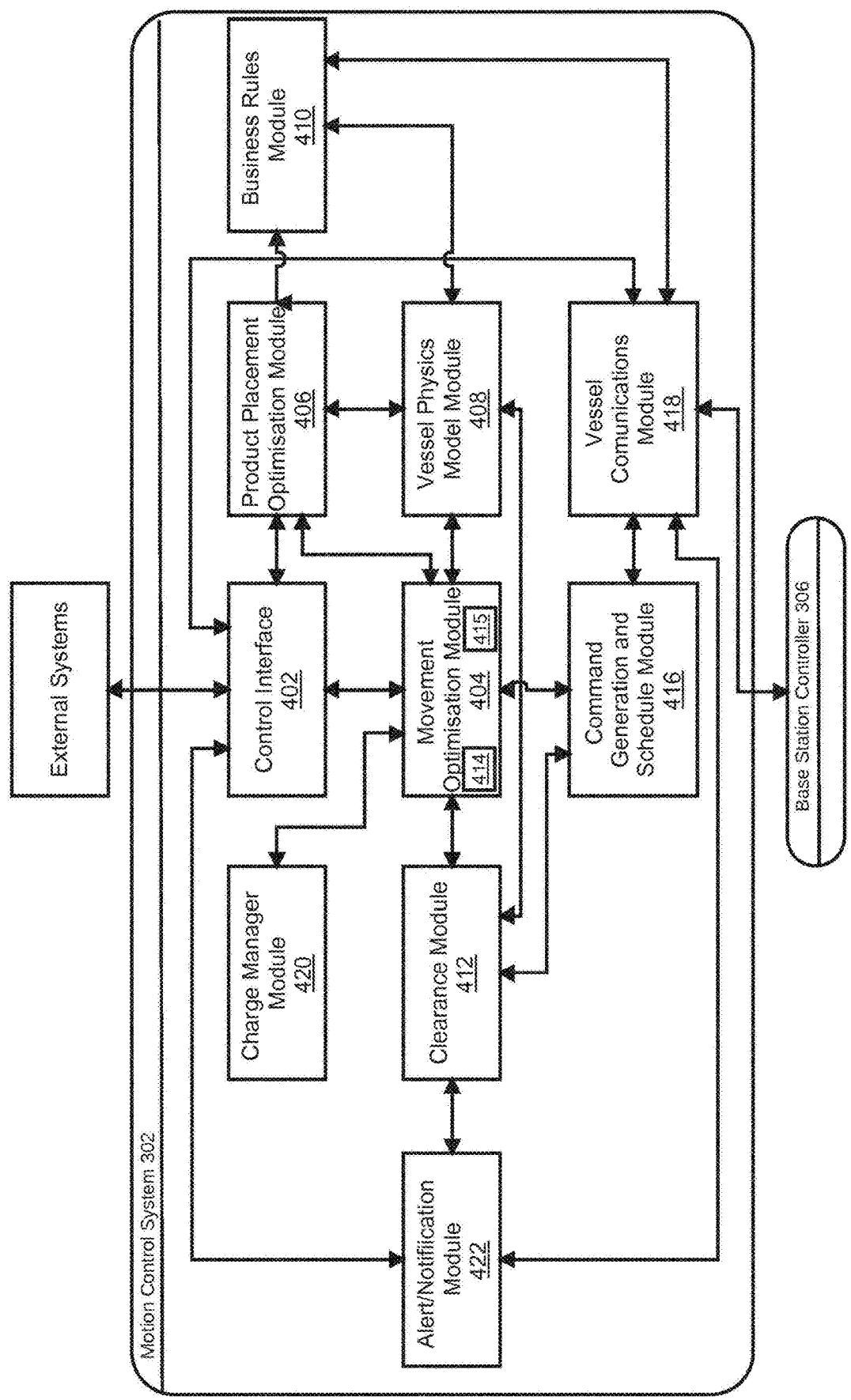
FIG. 4 is a schematic diagram of the vessel control system of FIG. 3 in greater detail and constituting a further embodiment of the invention.

Referring to FIG. 4, the motion control system 302 is configured to evaluate how to improve work allocations, movements of product and placement of product. The motion control system 302 is configured to schedule when specific types of movements should happen and in what order they should occur, depending on, for example, the application of various business rules and/or priority. The motion control system 302 is configured to determine both inbound and outbound factors in making decisions relative to, for example, product placement. For example, the motion control system 302 estimates delivery location of product supply, and estimated outbound delivery of product. The motion control system 302 makes decisions, and sends signals for execution by an automatic system, and/or can allocate tasks efficiently to humans (pickers, loaders etc.).

The motion control system 302 determines which of one or more transporting vessels 102 should be involved in the fulfilment of an order or for any other purpose. The action of the one or more transporting vessel can typically require the transporting vessels 102 to traverse the grid, and/or to conduct actions, such as support adjacent transporting vessels and/or locomote a given transporting vessel. The motion control system 302 is configured to analyse various pathways in the cluster 100 to determine one or more paths that are potentially preferential relative to other pathways, given a set of constraints and conditions. These preferential pathways are provided, one-time, periodically and/or dynamically to the transporting vessels 102 to control their movements throughout the cluster 100 and/or roles they perform within the cluster 100.

A path can be preferential for a number of reasons, including, but not limited to: less distance travelled, greater expected average velocity of load handling device, lower probability of encountering traffic (i.e. congestion), less total time required, lower probability of collision, less power used, ease of switching to alternate pathways, ability to avoid obstacles, for example a broken transporting vessel, a broken path, and/or a part of the path that is under repair.

The motion control system 302 uses various algorithms to identify, design and/or control the movement of various transporting vessels to which it is connected. In some examples, the motion control system 302 is implemented using one or more servers, each containing one or more processors configured to perform one or more sets of instructions stored upon one or more non-transitory computer readable media. Potential advantages for computer implementation include, but are not limited to, scalability, ability to handle large amounts of processing and computational complexity, increased reaction speed, ability to make decisions quickly, ability to conduct complex statistical analysis, ability to conduct machine learning, among others. These algorithms to coordinate traversal of the transporting vessels through the cluster 100 will be discussed in greater detail later herein.

The motion control system 302 can be a real or near-real time control system (controlling the actions of the various units including transporting vessels and optionally the associated other units involved, for example conveyors, pickers and/or humans). The motion control system 302 comprises a plurality of functional modules. The plurality of functional modules includes a control interface 402, a movement optimisation module 404, a product placement optimisation module 406, a vessel physics model module 408, a business rules module 410, a clearance module 412, a reservation module 414, a constraint checker module 415, a command generation and scheduler module 416, a vessel communications module 418, a charge manager module 420 and an alert/notification module 422. These modules 402, 404, 406, 408, 410, 412, 414, 416, 418, 420, 422 are implemented in various ways; in some examples they are implemented as applications stored as instructions on one or more computer-readable media to be performed by one or more processors.

The motion control system 302 provides real or near-real time control of the allocation of work and/or the movement of transporting vessels 102. The allocation of work and movement of transporting vessels 102 can be precipitated by actions as relevant to activities within a warehouse, such as the fulfilment of orders, the redistribution of transporting vessels, or containers optionally disposed therein, to more easily accessible positions, estimated dispatch sequences, maintenance operations, and/or anticipation of future orders. The control interface 402 provides an interface for various external systems to provide directions and information into the motion control system 302. The control interface 402 can, in some examples, provide interfaces for human users and/or interfaces for interfacing with various machines and systems.

The control interface 402 can interact with various external databases, including but not limited to various warehouse management systems and order management systems. The control interface 402 can also receive information from the various robotic devices in the system, for example a malfunctioning transporting vessel 102, a transporting vessel 102 requiring charging, a transporting device 102 en route to a destination, a transporting vessel 102 encountering an unexpected obstacle.

As mentioned above, the control interface 402 also receives and transmits information to and from the warehouse management system 312 relevant to the control and movement of transporting vessels 102. Such information can include, but is not limited to, grid location and sizing, the establishment of sub-grids, master records of inventory and orders and/or a dispatch sequence, for example when orders need to go out. As actions are performed, for example transporting vessels, with or without containers therein, brought to workstations, workstation operations completed and/or delivery totes filled, the control interface 402 provides updates to the warehouse management system 312. In some examples, there is a confirmation process between the warehouse management system 312 and the control interface 402.

The control interface 402 can also receive commands to stop the operation of a particular transporting vessel 102, a group of transporting vessels 102 or all of the transporting vessels, for example in the event of a malfunction or an emergency.

The movement optimisation module 404 can be configured to optimise the movement of transporting vessels 102 through applying various algorithms to determine potentially advantageous routes from one location to another. The potential advantages can include shorter distance travelled, lower likelihood of encountering congestion, shorter time required, lower power consumption, coordination with movements of other load handling devices, routing around obstacles such as broken transporting vessels or broken areas of track, or coordination with various workstation operations.

The movement optimisation module 404 is configured to provide work allocation, planning and scheduling functions, including developing a set of tasks and then selecting which pick station or transporting vessel should conduct which task. The movement optimisation module 404 is, in this example, configured to interact with the product placement optimisation module 406 in determining a set of potentially advantageous locations to place an object. In optimising movement, the movement optimisation module 404 is configured to consider various factors involved in both movement and the performance of an operation, for example the expected time required to get to a particular location, how deep the transporting vessel 102 is within the cluster 100, how long it would take for the transporting vessel 102 to emerge from the cluster 100 and/or the various operations necessary to move transporting vessels 102 located above to other locations.

The movement optimisation module 404 also receives a set of inputs from the vessel physics model module 408, which can communicate a set of constraints on the movement of the transporting vessels 102 depending on various factors, for example the transporting vessel 102 can only move at 50% of the maximum velocity as the transporting vessel 102 is currently carrying delicate objects. The movement optimisation module 404 coordinates the movement of transporting vessels 102, with or without containers therein, into the cluster 100, out of the cluster 100 and within the cluster 100.

In some examples, the movement optimisation module 404 dynamically recalculates preferential paths during the course of a transporting vessel's journey to determine potentially an updated set of paths as conditions and constraints change over time.

The movement optimisation module 404 also interacts with the clearance module 312 and the reservation module 314 in determining whether the navigation of a proposed pathway will encounter issues involving the clearances and reservations of other transporting vessels 102 and also determining pathways that can reduce the chances of encountering these issues.

In some examples, the clearance module 412, the reservation module 414 and the movement optimisation module 404 are used together as a path conflict resolver, such that the movement optimisation module 404 develops a path and then reserves the path using the reservation module 414, and the clearance module 412 provides a just-in-time approach to determining priority when transporting vessels are engaged in potentially conflicting paths.

The vessel physics model module 408 is configured to store a set of variables that are designed to model the particular physical properties relevant to a transporting vessel. For example, the model can indicate physical characteristics such as the length, weight, height and width of the transporting vessel 102, the maximum carrying capacity of the transporting vessel 102, the rotational speed of the transporting vessel, the maximum velocity and acceleration of the transporting vessel 102, the ability for the transporting vessel 102 to perform certain actions given, for example, a set amount of battery life. The vessel physics module 308 interfaces with the business rules module 410 in determining limits on certain characteristics of movement of the transporting vessel 102, including the maximum velocity, maximum acceleration, and maximum rotational speed of the transporting vessel 102. For example, if the transporting vessel 102 is carrying a number of cartons of eggs, the transporting vessel 102 can be required only to accelerate/decelerate at 25% of the maximum acceleration/deceleration of the transporting vessel 102 due to the vulnerability and fragility of the eggs in the presence of physical forces. The business rules module 410 develops and applies a set of business rules based upon the particular circumstances of the warehouse, transporting vessels 102 and communications systems. For example, the business rules module 410 can provide that for certain classes of items, various restrictions are in force for the vessel physics model module 408 potentially to reduce the amount of damage incurred by goods in transit. Examples of where business rules can be implemented include high risk products, for example acid or bleach, containers with aerosols, and containers with flammable contents, among others. Empty transporting vessels can also be treated differently to other transporting vessels.

The clearance module 412 is configured to store and provide clearances for various transporting vessels 102. A system of clearances can be assessed to determine whether a path is clear for a transporting vessel 102 to traverse. The clearance module 412 can be implemented as a passive collision avoidance system, wherein transporting vessels 102 are only given the smallest amount of work possible without impacting performance. Upon providing a transporting vessel 102 with a new instruction, the clearance module 412 checks that it is not possible to collide with another transporting vessel 102, based upon, for example, grid dimensions, grid positions, move commands generated by planning, cancellation of move commands (generated on events such as a controlled stop), the current positions and speeds of the transporting vessels 102, braking ability of transporting vessels 102 as well as where they have been cleared to visit.

The clearance module 412 is configured to issue clearance "just in time", and is used to grant permissions to transporting vessels 102 to continue along their planned paths.

The clearance module 412 provides to the control interface 402 what the clearances for a path would be, notification of when a clearance is issued, for example using strategies known in the art and so will not be described further herein.

The reservation module 414 is responsible for reserving spaces in or around the cluster 100.

In some examples, the reservation module 414 is used to reserve routes in advance and to make sure that transporting vessels 102 do not plan to take conflicting paths, especially where the transporting vessels 102 are participating in a large number of actions and tasks taking place simultaneously. The movement optimisation module 404 comprises the reservation module 414 to establish the path reservations for transporting vessels 102 sufficiently far into the future to enable forward planning.

The command generation and scheduler module 416 generates a set of instructions to be transmitted to the one or more transporting vessels 102. These instructions can include, for example, that a given transporting vessel 102 is required to move from a location A to a location B in order to be correctly located in order to support locomotion of another transporting vessel for part of a path through the cluster 100, for example to a workstation, such as for picking items disposed adjacent the cluster 100, or a so-called decant station or a tote load/unload station disposed adjacent the cluster 100, such as for inserting a tote into a transporting vessel or removing a tote from a transporting vessel. These instructions can be transmitted in a near-real time/real-time configuration, in a just-in-time configuration, and/or provided ahead of time to allow for planned/scheduled routes. Further, in some embodiments, the command generation and scheduler module 416 coordinates the reservations and clearances to help a transporting vessel 102 expeditiously navigate its way across a facility.

The command generation and scheduler module 416 is configured to provide a command set comprising a single path, or one or more paths, and/or a number of operations to be performed at various locations. The command generation and scheduler module 416 provides these commands to the vessel communications module 418 to be provided to the individual transporting vessels 102. In some examples, the command generation and scheduler module 416 pre-populates instructions for a particular transporting vessel 102; these instructions can then be provided to the transporting vessel 102 through the vessel communications module 418 to be executed at a future time.

The vessel communications module 418 is configured to communicate information back and forth from the transporting vessels 102 via the one or more base stations and the base station controller 306. As indicated above, in some examples, the vessel communications module 418 communicates through the use of wireless signals. As also indicated above, these instruction sets are not necessarily just-in-time; instruction sets can be sent for the coordination of future movements. The vessel communications module 418 receives status reports from various transporting vessels 102. The vessel communications module 418 can be implemented in various ways, such as using synchronous, asynchronous, polling, push or pull methodologies. Further, various implementations do not necessarily include the use of communications "handshaking".

The alert notification module 422 is configured to provide an alert or notification to the control interface 402 when a potential issue has arisen, or based upon a predetermined business rule, for example a predetermined number of clearances have been withheld due to conflicts.

Operation of the system will now be described with reference to the problem of a single transporting vessel traversing a simplified cluster structure, for example of FIG. 1. It will be appreciated that the simplified example described below can be extended to cover a larger number of transporting vessels 102, a larger cluster than described below, multiple directions of travel in x, y and z directions, and indeed a cluster having a different shape.

Figure 5:
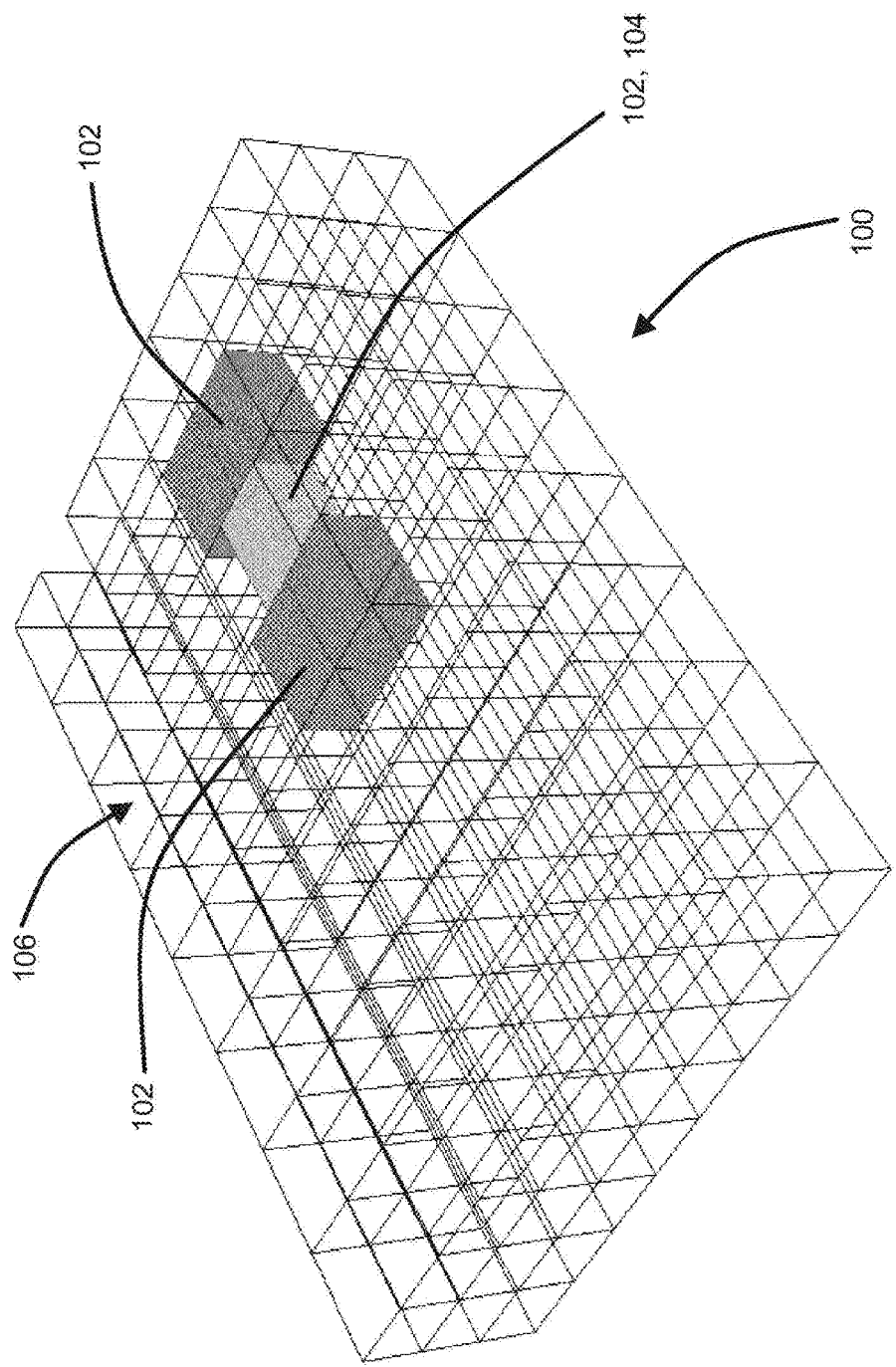
FIG. 5 is a schematic diagram of the cluster of FIG. 1 in a second state.

In operation, and referring to FIGS. 1 and 5, a transporting vessel 104 located at a start location within the cluster 100 is selected in accordance with any appropriate criterion set forth above, for example it is necessary to recover a transporting vessel containing eggs for packing into a tote for delivery to a customer and is required to be relocated to a destination location 106.

Figure 6:
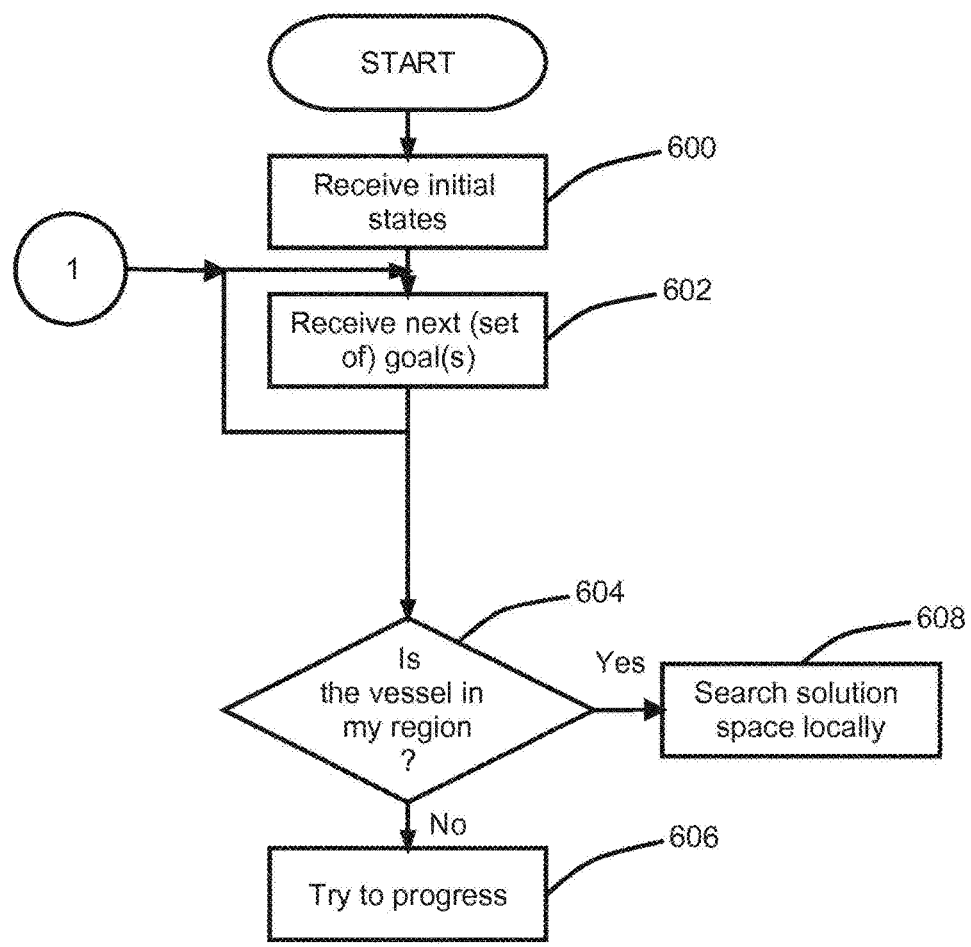
FIG. 6 is a flow diagram of a first part of a method relocating a relocatable transporting vessel within the cluster of FIG. 1 and constituting a yet further embodiment of the invention.

In this example, and referring to FIG. 6, the cluster 100 is notionally sub-divided into regions to facilitate, in this example, scaling of the size of the cluster 100. A first example is of the transporting vessel 104 being required to move from the start location to the destination location 106, where the start and destination locations are within the same region. A second example, described later herein, contemplates the start and destination locations being in different respective regions of the cluster and so will be described in the context of the processing of FIG. 6 being performed independently by the motion control system 302 in respect of the different regions of the cluster 100.

Consequently, for the region of the cluster 100 in which the start location and the destination location 106 are located, the motion control system 302 performs the following processing. Firstly, the motion control system 302 receives (Step 600) initial state data from each of the transporting vessels 102 within the region of the cluster 100 in order to know the initial locations of the transporting vessels 102 within the cluster 100 of transporting vessels 102. Subsequently, following initialisation, the motion control system 302 receives (Step 602) one or more goals from, in this example, the control interface 402, for example a goal to relocate the transporting vessel 104 from a start location to the destination location 106. The goal can also be a request to leave a given location within the cluster 100 empty or the given location within the cluster 100 occupied by a transporting vessel.

The motion control system 302, in respect of the region, determines whether the start location and the destination location 106 are located in the region, which clearly in the present example is the case. In the event that the start location and/or the destination are/is not in the region, the motion control system 302 executes an algorithm in an attempt to progress (Step 606) the relocation of the transporting vessel 104. However, in the event that the start location and the destination location are both found to reside in the region, motion control system 302 performs a search (Step 608) to determine possible sequences of states that can be implemented in order to relocate the transporting vessel from the start location to the destination location as will be described in greater detail below.

Figure 7:
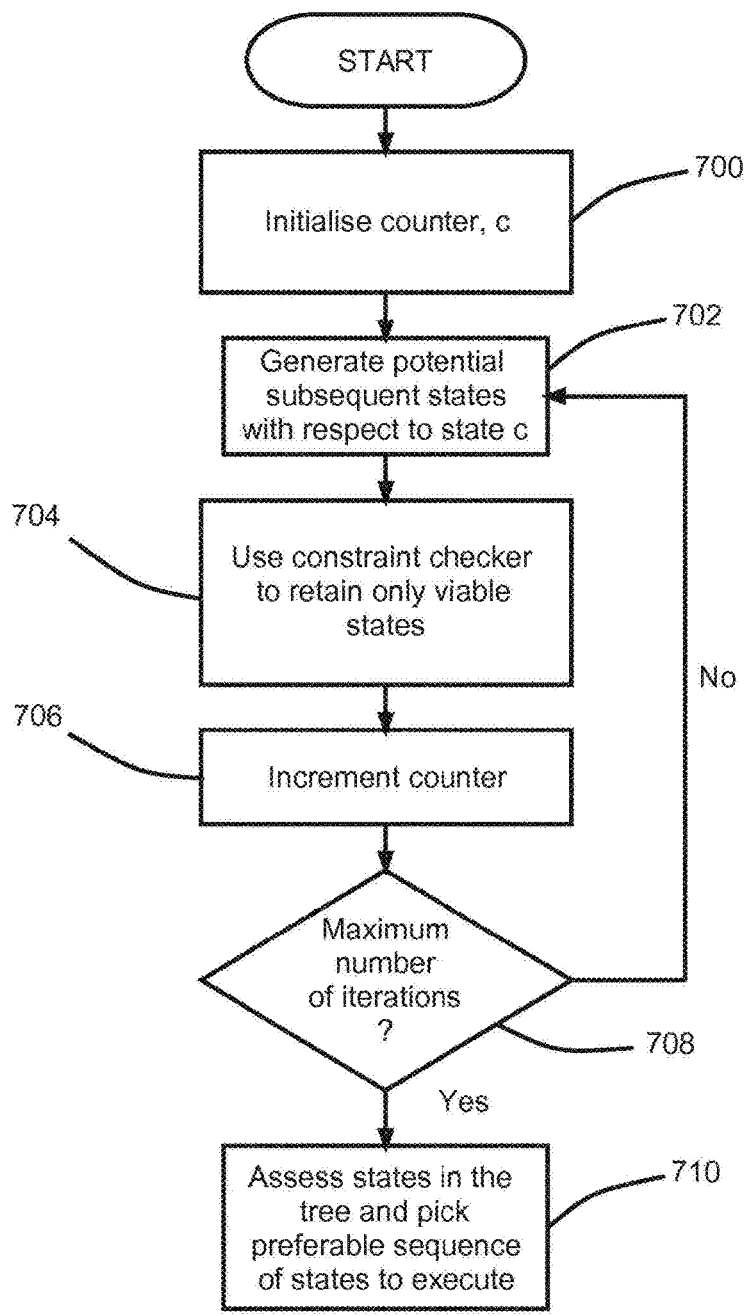
FIG. 7 is a flow diagram of a second part of the method of relocating the relocatable transporting vessel.

Referring to FIG. 7, in respect of the region containing the start location and the destination location, the motion control system 302 determines a number of sequences of changing states required to relocate the transporting vessel from the start location to the destination location 106. In this regard, the motion control system 302 limits, in this example, the depth of the search tree, namely the number of states in the sequence for each distinct path of state changes. In this regard, each sequence of states from the top of the tree to the lowest part of the tree constitutes a permutation of states. As such, in this example, the motion control system 302 initialises a counter (Step 700) to a value of unity and has a maximum depth of state changes to check against. The motion control system then determines (Step 702) a first set of potential initial steps. The motion control system 302 then uses the constraint checker module 415 in order to determine (Step 704) which of the states determined are viable according to the physical constraints of the cluster 100, for example shape of the cluster and transporting vessel parameters as described herein, i.e. the states do not suffer from any impediments, such as being incapable of supporting motion of the transporting vessel 104. In some examples, other parameters that can be employed in order to assess viability include, for example: the number of transporting vessels in each stack, the number of unsupported transporting vessels in each stack, weight of the payload in the transporting vessels, the distribution of weight within each transporting vessel, the distribution of weight across a number of transporting vessels, the kind of payload borne by the transporting vessels, and/or the manner in which a transporting vessel is supported within cluster 100, for example a type of suspension, such as from a single neighbouring transporting vessel.

Thereafter, the motion control system 302 increments (Step 706) the counter and then checks (Step 708) whether the maximum depth of the tree of the sequence of states has been reached. In the present example, the maximum number of iterations has not been reached and so the process is repeated in respect of the states remaining in the first set of initial states after being filtered by the constraint checker to remove non-viable states. In this respect, the motion control system 302 determines (Step 704) a second set of possible subsequent states that can be achieved, starting from each of the first set of remaining states. Again, the constraint checker is employed (Step 704) in order to identify only viable states in the second set of subsequent states. The counter is then incremented (Step 706) again and the counter is checked to determine (Step 708) whether the maximum number of iterations has been reached.

The above process is repeated until the maximum number of iterations has been reached. In this example, the search tree is obtained by the above steps is through execution of an Iterative Deepening A* Variant algorithm, for example as describe in "Depth-First Iterative-Deepening: An Optimal Admissible Tree Search" (R E Korf, Artificial Intelligence, Vol. 27, No. 1, 1985, pages 97 to 109) and "Finding Optimal Solutions to the Twenty-Four Puzzle" (Korf et al., AAAI Proceedings 1996, pages 1202 to 1207). However, where the current location, for the start location, is sufficiently close to the destination location 106, an A* search can be implemented instead of the Iterative Deepening A* Variant algorithm in order to reduce computational overhead and, in some examples, produce qualitatively improved, for example having lower costs associated therewith, permutations of sequences of states.

Once the search tree has been computed, the motion control system 302 analyses (Step 710) the branches of the tree of sequence of states and selects an acceptably convenient sequence of states from all the sequences of states as defined by a cost function, thereby satisfying a predetermined metric. In this regard, the motion control system 302, in this example, implements a holistic assessment of each permutation of states. Each permutation of states can comprise one or more straight or L-shaped traversal across the cluster 100, ignoring depth. For each state of the traversal, the transporting vessel 104 is effectively in a stack of transporting vessels for a given integer position of the cluster 100 for a given time. The motion control system 302 assesses the stack in which the transporting vessel 104 resides for the state being analysed. For example, the motion control system 100, at the depth in the stack of the transporting vessel 104, determines the number of transporting vessels that are above the transporting vessel 104 that would be unsupported. Additionally, or alternatively, other factors can be taken into account when costing the state being assessed. For example, the financial value of the payload, the number of transporting vessels in the stack or in the stack but only above the transporting vessel, weight of the payload of one or more transporting vessels, the distribution of weight within the transporting vessels, the kind of payload borne by the transporting vessels, and/or the manner in which a transporting vessel is supported within cluster 100, for example a type of suspension, such as from a single neighbouring transporting vessel. The costing parameters can be used alone or in combination, by summation or, for example, by employing a cost function that uses the costing parameters. The skilled person should, however, appreciate that the cost function can be parameterised in other ways in order to determine the cost of relocating the transporting vessel 104 in accordance with a given permutation of sequences of states.

Once the cost of each permutation of states has been determined and a preferable sequence of states has been selected, the motion control system 302 implements the sequence of steps and the transporting vessel 104 is moved, relative to other transporting vessels within the cluster 100, from the start location to the destination location 106. In this respect, one or more other transporting vessels can cooperate with the relocatable transporting vessel 104 in order to facilitate controlled translation of the relocatable transporting vessel 104 within the cluster 100. During this process, the reservation module 414 tracks the states in the sequence of the selected sequence of states.

In another embodiment, in order to assess states (Step 710, FIG. 7), a supervised learning technique can be employed. In this respect, a network structure is arranged to determine costs associated with determined permutations of sequences of states generated by, for example, the local search algorithm mentioned above. Using known cost data respectively associated with known paths, using any appropriate search and costing techniques, the network structure is "trained" so that parameters of the network structure are optimised in order to ensure that the cost determined by the network is substantially close to the known cost data. Thereafter, the trained network can be employed in order to calculate costs respectively associated with different permutations of sequences of states.

In the second example, as mentioned above, the start location and the destination location are located in different regions of the cluster 100.

Figure 8:
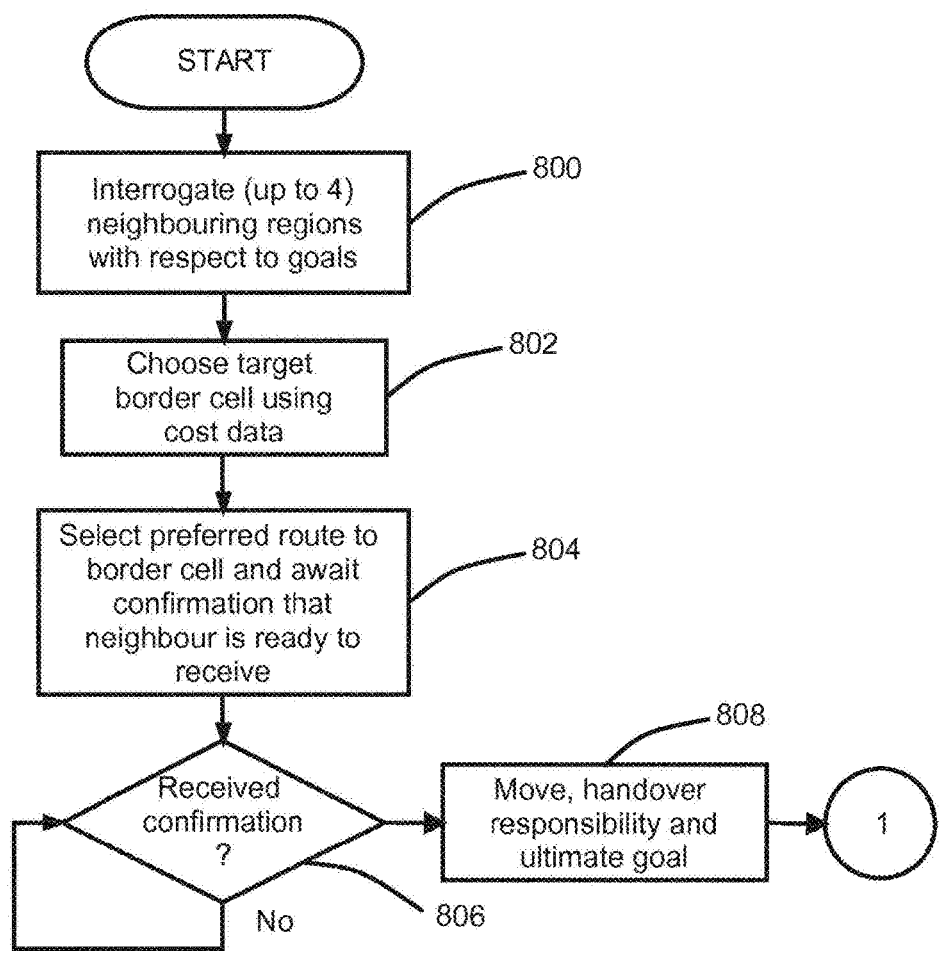
FIG. 8 is a flow diagram of a third part of the method of relocating the relocatable transporting vessel.
Figure 9:
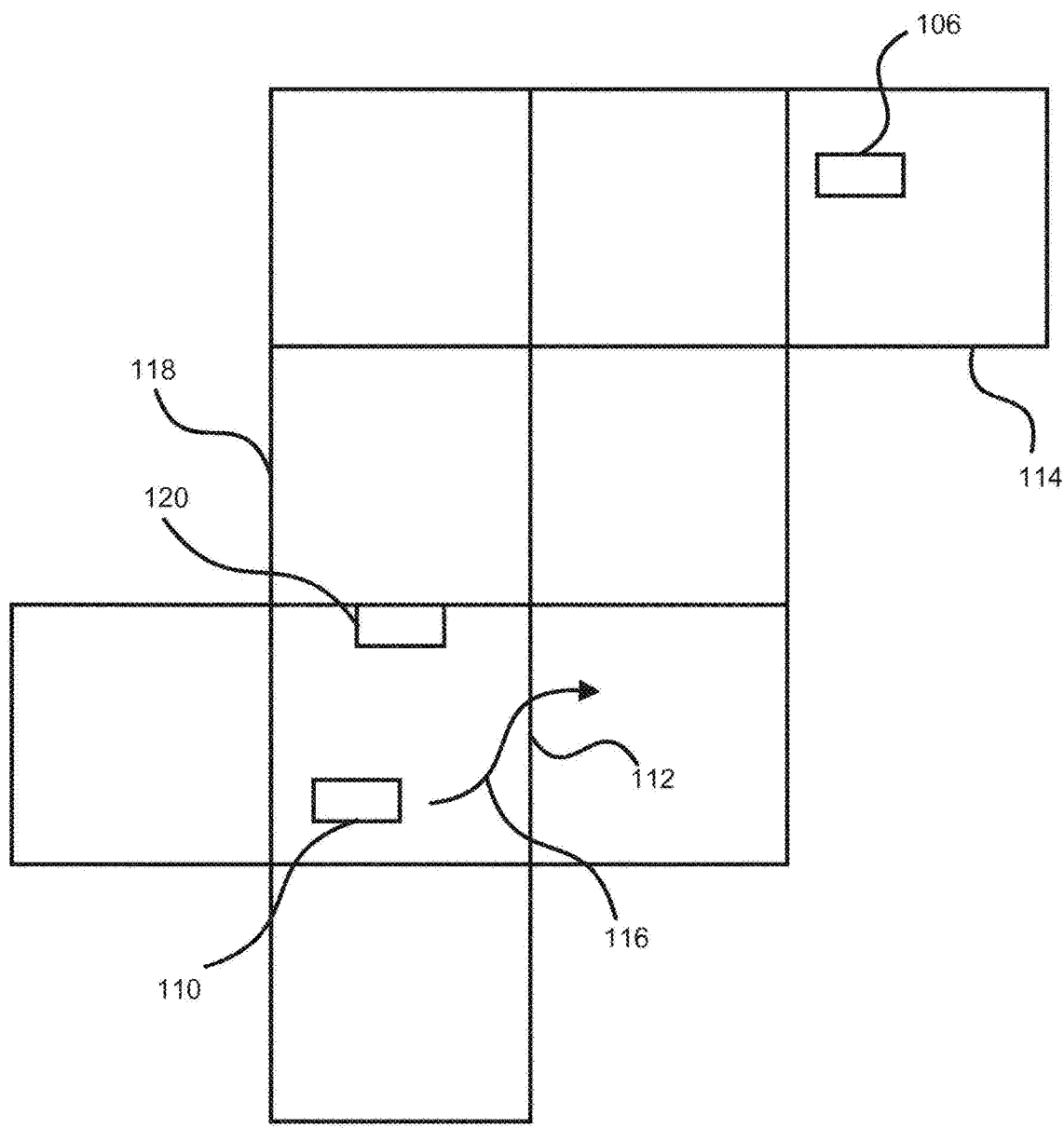
FIG. 9 is a schematic diagram of a two-dimensional representation of regionalisation of a cluster.

Turning to FIG. 8 and FIG. 9, in this example the start location 110 of the transporting vessel 104 is in a first region 112 and the destination location 106 is in a second region 114 of the cluster 100. In order to progress the relocation of the transporting vessel 104, the motion control system 302 attempts to identify a waypoint location at a boundary between regions. It should be appreciated that selection of a most obvious region of the cluster 100 as a region through which the transporting vessel 104 should relocate en route to the destination location 106 in the second region 114 is not necessarily acceptably convenient from a route planning perspective as compared with a more indirect route via another region. The motion control system 302 therefore considers relocating the transporting vessel 104 via up to a predetermined number of regions neighbouring a region, in this example up to four neighbouring regions and/or the first region 112, comprising the start location 110.

Consequently, in this example, the motion control system 302 interrogates (Step 800) the up to four regions neighbouring the first region 112 comprising the start location using the goal(s) received by an independent thread executing in respect of the first region 112. In this respect, the respective regional costs of crossing into each of the neighbouring regions selected at different border locations, constituting candidate border locations, between the neighbouring regions are analysed, the regional costs being based upon a localised assessment in respect of each neighbouring region without regard for other regions in the cluster 100, the state of the region, the locations of the region that have been reserved and the level of attainment of the goal(s).

For each candidate border location, the thread for the first region 112 performs, in a like manner to that described above in relation to FIG. 7, a local search (Step 608) in order to determine (Step 804) paths from the start location to the candidate border location and local costs associated therewith.

Thereafter, the thread corresponding to the first region 112 supported by the motion control system 302 combines, in this example the local costs and the regional costs in order to arrive at an overall cost of relocating the transporting vessel 104 via each candidate border location serving as a waypoint. In this example, the cheapest cost is selected and the neighbouring region 118 associated with the selected candidate border location 120 is notified of its selection. The motion control system 302 then awaits (Step 804) confirmation that the neighbouring region 118 associated the selected candidate border location 120 is ready to receive or will be ready to receive the transporting vessel 104 when the transporting vessel 104 reaches the border location. Once the confirmation is received from the neighbouring region 118, the motion control system 302 implements (Step 810) the relocation from the start location to the border waypoint location 120 selected and hands over responsibility for reaching the destination location 106 to the thread associated with the neighbouring region selected 118, which region treats the goal(s) received as new goal(s) and processes the goal(s) in accordance with the methodology of FIG. 6. As part of the process of achievement of the goal(s) the thread associated with the selected region 118 can be required to arrange locations near the selected waypoint location 120 so as to facilitate receipt of the transporting vessel 104 into the selected region 118.

As should be appreciated by the skilled person, relocation of the transporting vessel 104 can require the involvement of other transporting vessels in order to facilitate locomotion of the transporting vessel 104 to the destination location 106 by, for example a set of the transporting vessels to provide an internal physical sub-topology within the cluster 100. As such, it is typically necessary to execute movement of multiple transporting vessels to provide the sub-topology so as to achieve a goal of relocating the transporting vessel 104 from the start location 110 to the destination location 106. In some examples, it can be desirable to optimise the movement of multiple transporting vessels 104 in addition to the transporting vessel 104 that is the subject of a goal so that substantially contemporaneous movement of a number of the multiple transporting vessels is achieved. In this respect, a concurrency control methodology can be employed in order to minimise the number of state changes required to achieve locomotion of the transporting vessel 104. Such an approach can reduce the so-called "fan-out" of a search tree, for example of the type created in relation to FIG. 7, and provide computational efficiencies.

In some examples, an efficiency can be achieved by early termination of a search algorithm where a sequence of states is found to achieve the required goal(s) below a threshold cost or costs.

Additionally or alternatively, the above examples can readily be extended to instructions provided for traversal of multiple transporting vessels through the cluster 100 from respective start locations to respective destination locations. In such examples, the motion control system 302 determines at least another path for another transporting vessel within the cluster 100 for subsequent execution of movement of the another transporting vessel using the determined at least another path.

As will be further appreciated, the transporting vessels are not necessarily charged with a single task and so after completion of one route, a given transporting vessel can be tasked with reaching a new destination from a current destination.

In a further embodiment, the assessment and selection of a sequence of states can be achieved using a reinforcement learning technique. In such an implementation, a reinforcement learning system comprises a value network, a policy network, a rollout policy (or a combination of a subset of these where zero or more of each of the value network, the policy network and the rollout policy can be employed), state data relating to a current state of the cluster 100 and/or a region of the cluster 100 and goal data. Additionally, the reinforcement learning system comprises a so-called rollout policy and an existing heuristic state sequence assessment model of the kind described above. In this example, the policy rollout is obtained by way of a supervised learning technique trained to select a subsequent state from a current state using the heuristic state sequence assessment model to generate training data for use by the supervised learning technique.

A suitable reinforcement learning technique is employed, for example of the kind described in "Mastering the game of Go with deep neural networks and tree search" (Silver et al., Nature, Vol. 529, 28 Jan. 2016, pages 484 to 489), in order to train the reinforcement learning system and so develop the policy network and the value network. The reinforcement learning system can thus identify optimum sequences of states to be used in respect of relocating one or more transporting vessels.

Figure 10:
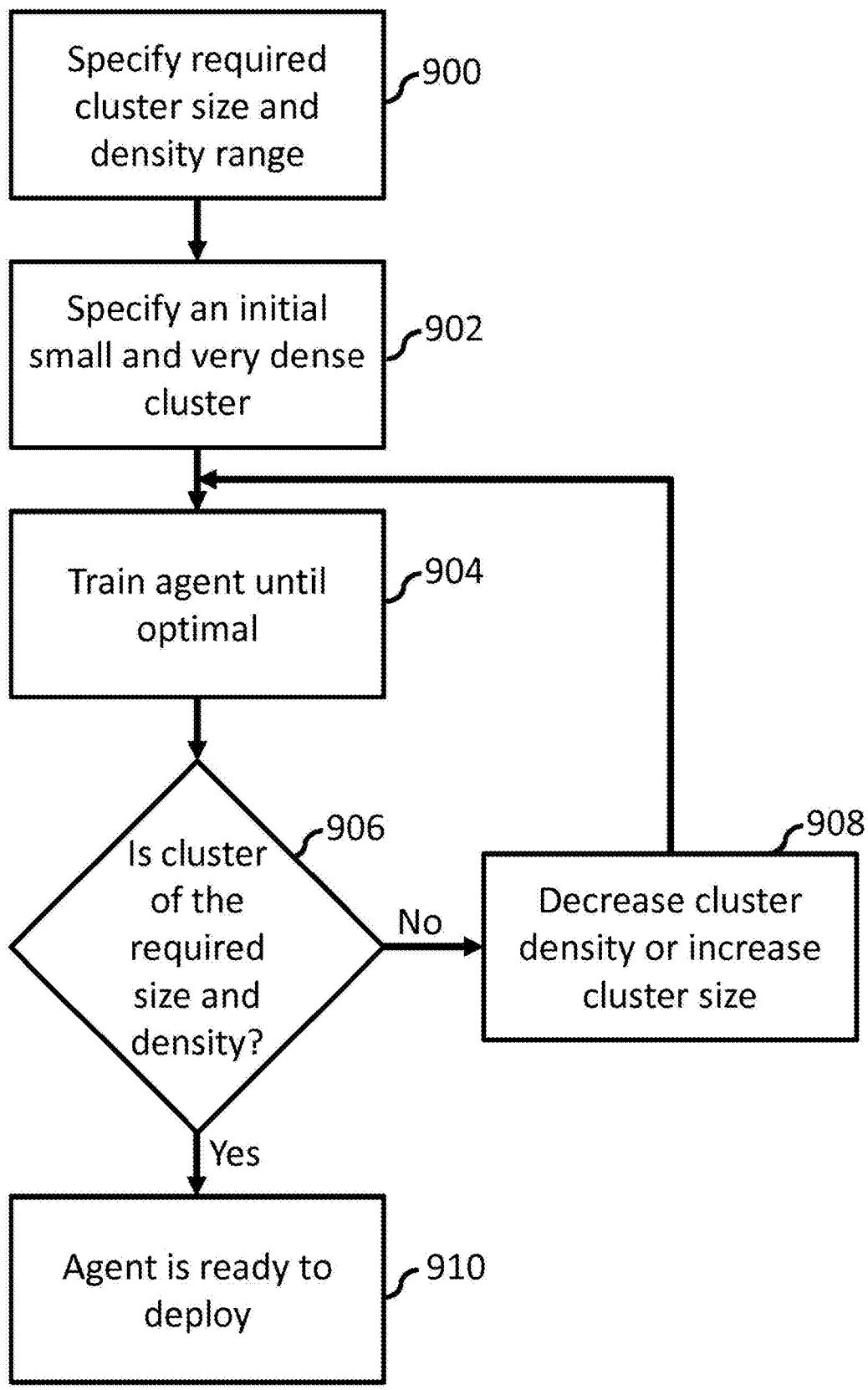
FIG. 10 is a flow diagram of an overview of a method of configuring an object handling coordination system.

In one example, the reinforcement learning technique can be employed either to a region of the cluster 100 or the whole cluster 100. Referring to FIG. 10, the motion control system 302 implements an agent configured to learn using the reinforcement learning technique in order to configure the object handling system described herein. A policy or value network for the agent is provided by way of a convolutional neural network and, in this respect, any suitable convolutional neural network can be employed as will be appreciated by the skilled person. Prior to deployment, the agent is trained, for example in the following manner.

As a general principle, the agent is trained by determining solutions to training problems using training clusters that are smaller than a desired cluster, the training cluster being scaled iteratively until the training cluster reaches a desired cluster size and cluster density. As such, in this example, the desired size of the cluster 100 and the desired density of the cluster 100 are specified (step 900) a priori. Typically, this is the size and density of the cluster 100 when deployed. The so-called problem space is then defined in order to set the parameters of an initial training simulation for the purpose of training the agent. In this respect, an initial size of a training cluster is specified (Step 902), which is smaller than the desired cluster 100, as well as a density of the training cluster. An initial cluster is, in this example, a 4×4×1 cluster. However, the skilled person will appreciate that the initial cluster size can be different and dimensioned differently. The initial cluster can be considered a seed for the purpose of training the agent and serves to support simple training simulations that can be built up to much larger training simulations.

The training cluster defined comprises a plurality of logically relocatable elements, which can be locations of logical transporting vessels, such as logical totes. The plurality of logically relocatable elements is arranged to emulate a three-dimensional cluster that has a reconfigurable topology. A number of the plurality of logically relocatable elements can be vacant locations, which defines the density of the training cluster. A number of the logical transporting vessels of the training cluster that are to be assigned destinations is also specified.

To facilitate processing and scaling, each location within the training cluster is represented by a 4-dimensional tensor. In this example, the first three dimensions of the 4D tensor correspond to coordinates in the training cluster 100. The fourth dimension of the tensor comprises metadata, for example whether the logically relocatable element is occupied and a relative position of a destination of the logically relocatable element, when assigned. The metadata can also comprise a history of prior relocations of the logically relocatable element.

Figure 11:
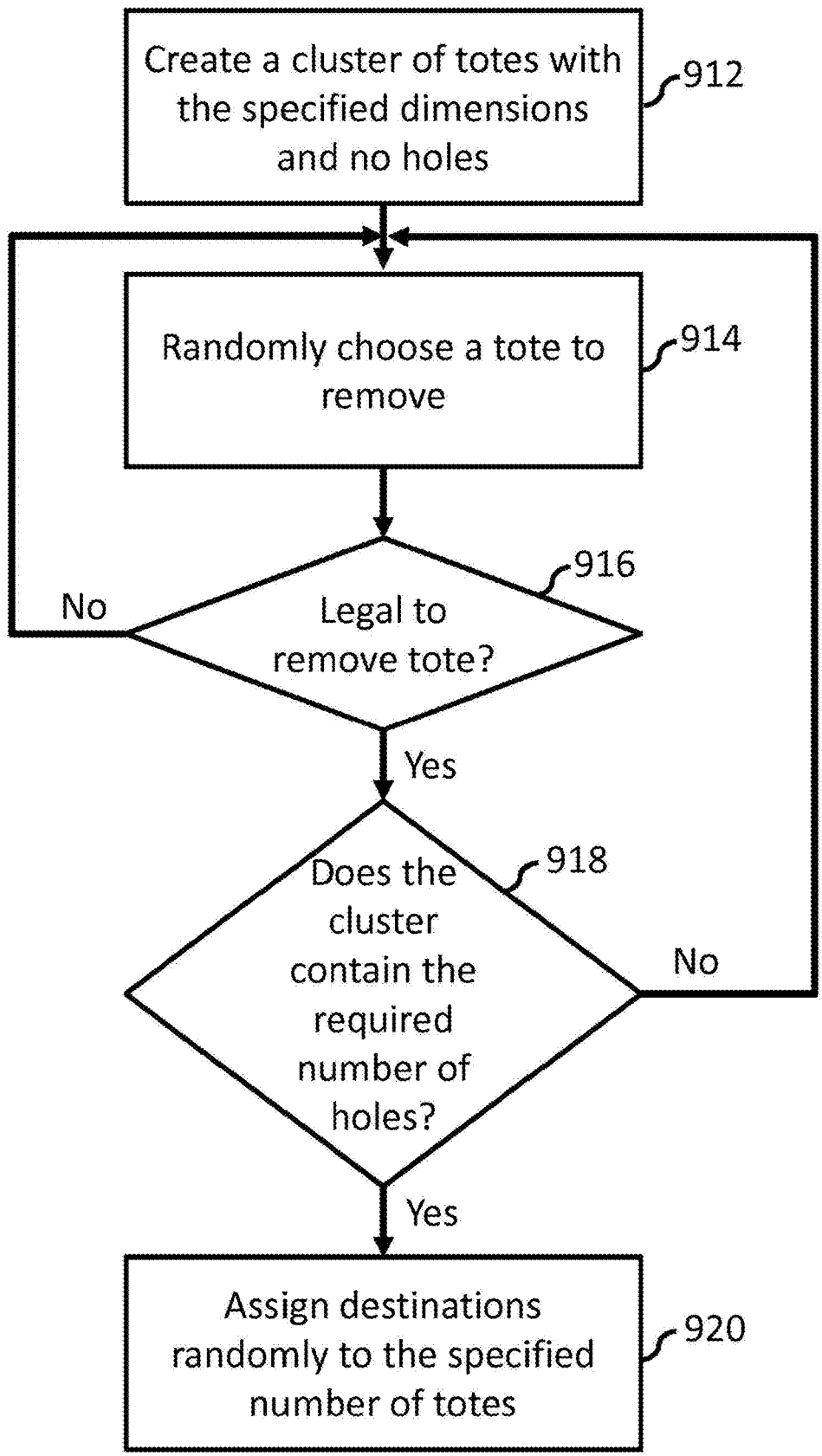
FIG. 11 is a flow diagram of configuration of a training cluster used in the method of FIG. 10.

Training (Step 904) of the agent is then performed as follows. Turning to FIG. 11, with knowledge of the size, density and number of destinations to assign for the training cluster, the agent initially sets (Step 912) the density of the initially specified training cluster to a maximum value, for example comprising zero vacant logically relocatable elements. Thereafter, the agent repeatedly removes (Steps 914, 918) at random a logical transporting vessel from the training cluster until the initially specified density of the training cluster is attained. Each selection of a logical transporting vessel for removal from the training cluster is verified to ensure that the removal is permitted (Step 916). Conditions to remove a given logical transporting vessel can relate to mechanics and/or constraints of the transporting vessel employed. The constraint checker module 415 can be used to determine whether removal of the logical transporting vessel is permitted. If a removal is not permitted, another logical transporting vessel is selected (Step 914) until a logical transporting vessel is found that can legitimately be removed. Once the specified density for the training cluster has been attained, the agent selects, at random, the number of logical transporting vessels of the training cluster to be assigned destinations within the cluster and the destinations are selected at random and assigned (Step 920) to the selected logical transporting vessels. The selection of the destinations is, however, subject to one or more constraints. For example, for reasons of mechanical constraints, selecting corners as destinations can be prohibited. Use of start locations as destinations can also be prohibited. The constraint checker module 415 can, again, be employed to determine prohibited destination selections.

Based upon the training cluster defined above, the agent then attempts to determine one or more sequences of moves, also referred to herein as one or more trajectories, of one or more logically relocatable elements in order to move each of the logical transporting vessels assigned destinations to the respectively assigned destinations. In this example, the agent considers solving the current training simulation in terms of relocations of the vacant locations or voids in the training cluster, which also constitute logically relocatable elements, in order to move the logical transporting vessels assigned destinations to their respective destinations. In this respect, relocation of the vacant locations is computationally more efficient than considering relocation of the logical transporting vessels surrounding a given void, or "hole", in the training cluster.

The agent therefore accesses (Step 922) a stored snapshot of the current status of the training cluster, which can include the location of each logical transporting vessel in the training cluster. The agent then selects (Step 924) a logically relocatable element to which an action is to be assigned. In this example, the logically relocatable element is a vacant location within the training cluster. The agent maintains a list of actions already planned by the agent and this information is accessed (Step 926) by the agent to generate (Step 928) a representation of a current state of the training cluster, since the generation of actions selected by the agent is sequential and the effect of actions immediately prior to choosing a subsequent action needs to be known to the agent and taken into account. The agent then determines (Step 930) an action for the selected logically relocatable element, for example the vacant location selected. In this example, the action is selected (Step 930) in accordance with the methodology described above in relation to the previous examples. For example, the agent can choose actions in accordance with a policy trained thus far by the agent supported by the neural network. A reward function is implemented and can, for example be based on a rule set that allocates a "reward" of −1 to logically relocatable elements that do not reach their respective destinations and 0 for logically relocatable elements that reach their respective destinations. Alternatively, a reward of 0 can be allocated in respect of logically relocatable elements unless a given logically relocatable element reaches an assigned destination in a final relocation step when all active logical transporting vessels have finished moving, in which case the reward is proportional to the distance between a starting location and a destination location of the given logically relocatable element, for example a so-called Manhattan distance. The actions are, in this example, represented using as 1-hot tensors, where 0 represents staying stationary, and 1 to 6 represent directions of movement, for example North, East, South, West, Up and Down. Once a relocation has been selected for the selected logically relocatable element, the selected action is stored (Step 932) and the agent then determines (Step 934) whether all possible actions have been considered. In the event that other actions can be performed, for example by other logically relocatable elements, the actions are determined by repeating steps 924 to 934 above until no further actions are determined to be available. Thereafter, once a set of actions has been determined, the agent records these actions as a selected trajectory or relocation path (Step 936) and the neural network is updated by, for example, updating the weights in the neural network. The set of actions can be deemed to be complete once all logical transporting vessels have reached their assigned destinations or the simulation can be continuous for a predetermined period of time and logical transporting vessels can be assigned further destinations. However, once the training simulation has been completed, the list of planned actions is then cleared.

In another example, the trajectories generated can be used to generate additional data to update the neural network, for example, by virtue of rotations of trajectories, reflections of trajectories, reversing time of trajectories and/or changing the destinations assigned to logical transporting vessels of trajectories retroactively.

Figure 12:
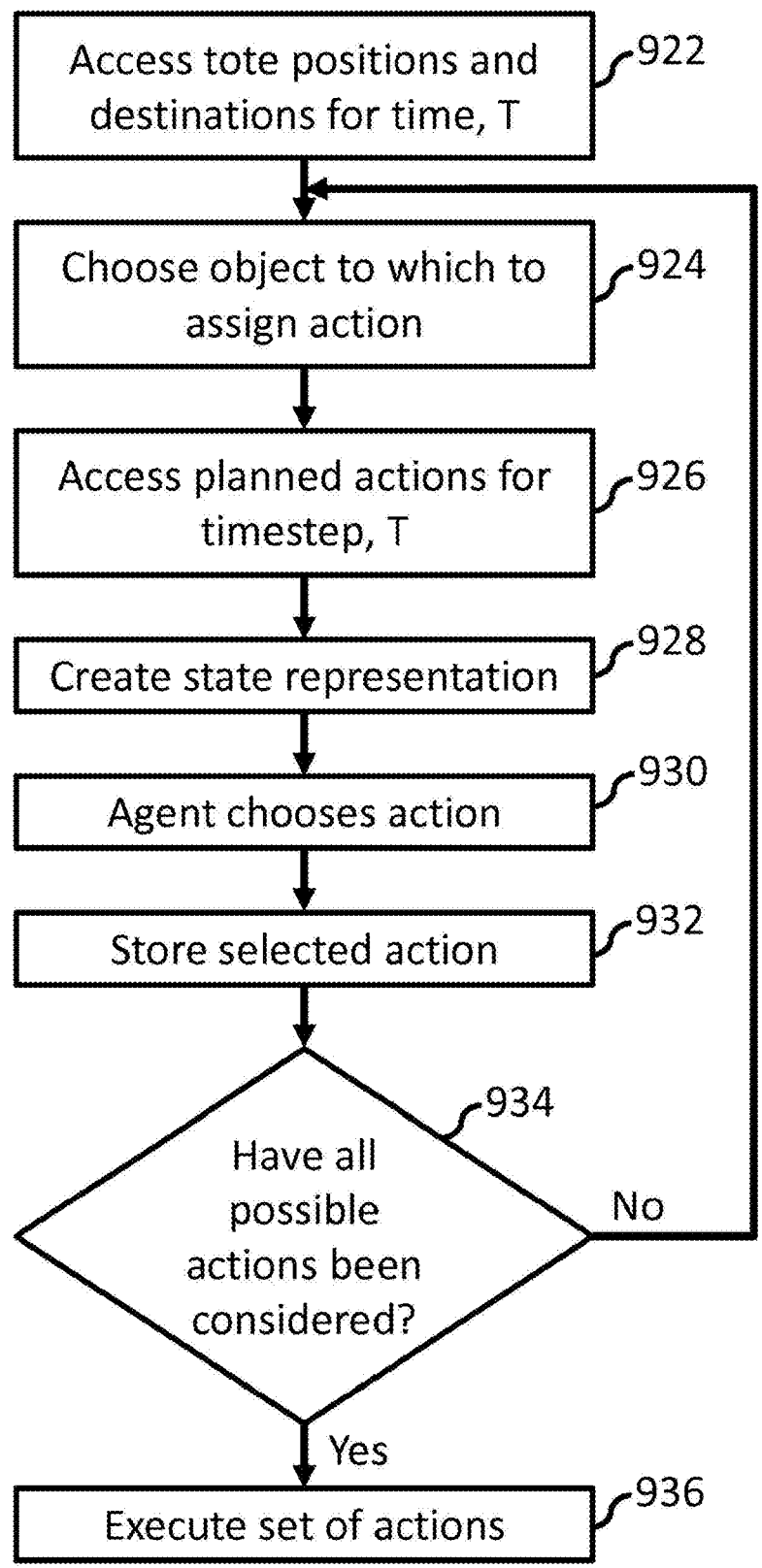
FIG. 12 is a flow diagram of selection of a relocation action used in the method of FIG. 10.

Training using the initial training cluster is repeated until satisfactorily optimised (the skilled person will appreciate that the necessary degree of repetition is variable depending upon, for example progress in training, such as whether change in reward calculated is negligible) by repeating the process of FIG. 11 to reconfigure the initial training cluster and assignment of logical transporting vessels and their associated destinations, followed by a repeated execution of the process of FIG. 12 to determine trajectories. Once the agent has been trained sufficiently in respect of the initial training cluster, and referring back to FIG. 10, the agent then determines (Step 906) whether the size of the training cluster and density of the training cluster correspond to the desired size of the cluster 100 and the desired density of the cluster 100. If the training cluster is not of the desired size and density, the agent adjusts (Step 908) the training cluster, for example by decreasing the cluster density and/or increasing the size of the training cluster and repeating (Step 904) the above training simulation of training the agent in respect of the revised training cluster, where the initial size of the training cluster and the initial density of the training cluster parameters are replaced with the updated size of the training cluster and the updated density of the training cluster as the input cluster structure and the input cluster density, respectively. The above process is repeated until the desired size of the cluster and the desired density of the cluster is achieved, the agent being able to benefit from the training already acquired from training simulations conducted in relation to prior training clusters.

Once the agent has been trained, the agent can be deployed to determine actions to relocate totes in an actual cluster, for example the cluster 100 described above in relation to other examples described herein. The system can be employed in a Customer Fulfilment Centre (CFC) or form part of a larger CFC or warehouse or fulfilment centre in an online retail system.

In addition to employing the reinforcement learning or as an alternative, for example in conjunction with other compatible methodologies described above, the cluster 100 can be configured to provide rotating flows of multiple transporting vessels, for example one or more loops of transporting vessels within the cluster 100 that serve as highways for relocating transporting vessels across the cluster 100. In this regard, a given transporting vessels can join a circulating flow of transporting vessels in order to be carried by the "current" of moving transporting vessels towards a destination location assigned to the transporting vessel. The motion control system is arranged to incorporate the existence of such a flow of flows within the cluster 100 when determining a trajectory to relocate the transporting vessel within the cluster 100. Of course, multiple transporting vessels that require relocation can take advantage of the one or more flows of transporting vessels.

In another embodiment, the motion control system 302 has a maintenance mode. For example, in the event the transporting vessel 104 develops a fault and needs to be accessed while within the cluster 100 by a human operator or a maintenance robot, the motion control system 302 enters the maintenance mode and instructs a number of the transporting vessels to providing a number of neighbouring voids, for example by using the goal of making a location in the cluster 100 to make a number of locations within the cluster 100 empty, thereby creating a passageway to the faulty transporting vessel 104.

In a further embodiment, in the event that the transporting vessel 104 is determined to be faulty, the motion control system 302 generates a goal of relocating the faulty transporting vessel 104 to a predetermined location at a periphery of the cluster 100, thereby effectively ejecting the faulty transporting vessel 104. In this regard, depending upon the malfunction suffered by the transporting vessel 104, a different drive principle where available can be employed to eject the transporting vessel 104 from the cluster 100. In this regard, the motion control system 302 can employ a different approach to coordination of transporting vessels in the cluster 100. For example, the constraint checker 415 of the motion control system 302 can use different criterion when assessing permutations of sequences of states.

The above implementations have been described in the context of a warehouse comprising the cluster 100. However, the skilled person should appreciate that the above system finds applications in other environments, for example within a vehicle or in an aeronautical context, for example in space.

Figure 13:
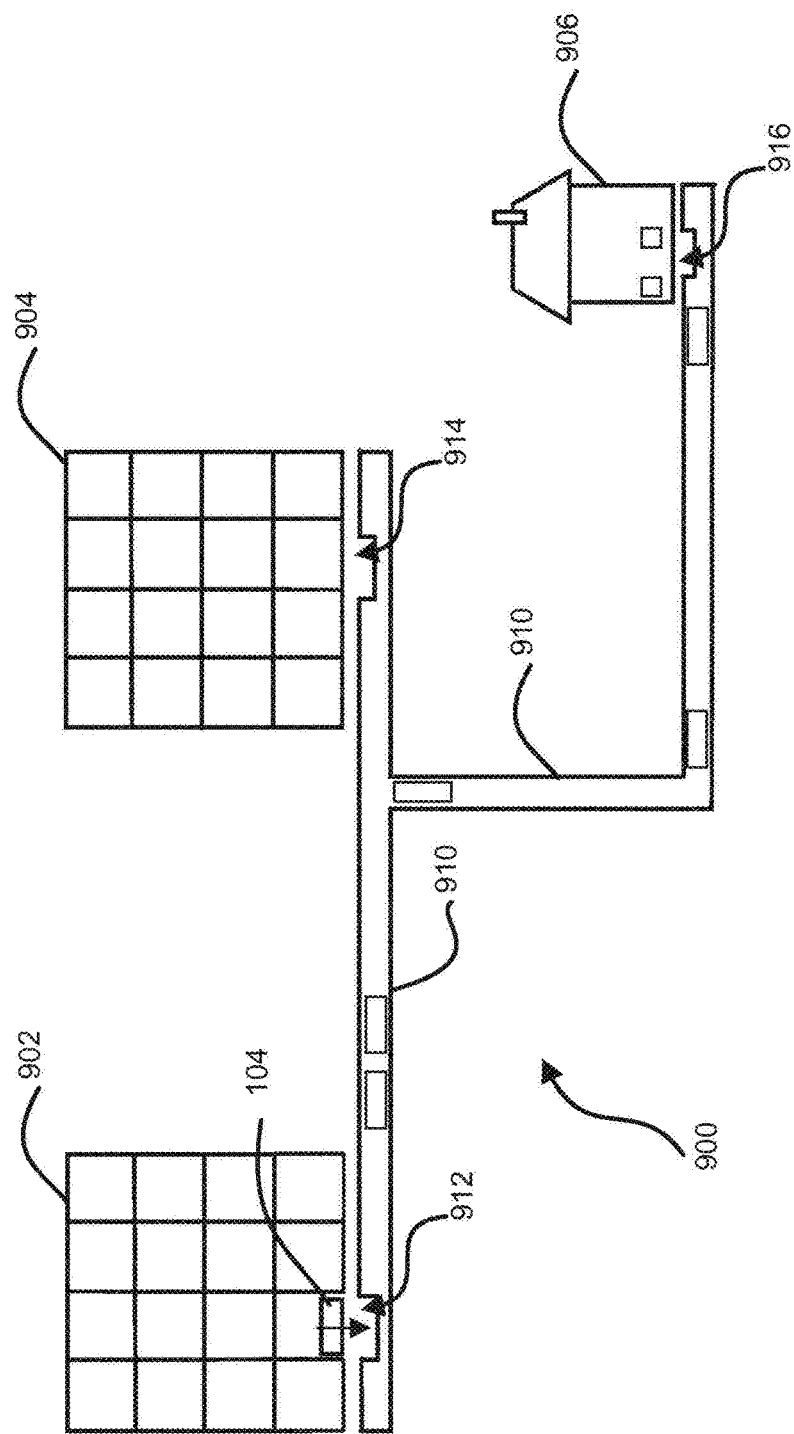
FIG. 13 is a schematic diagram of a distribution system constituting a further embodiment of the invention.

In yet another embodiment (FIG. 13), a distribution system 900 comprises a first cluster 902 of transporting vessels at a first location, a second cluster 904 at a second location and a dwelling 906 at a third location. The first cluster 902, the second cluster 904 and the dwelling 906 are superterranean and served by a subterranean conduit network 910. A first port 912 is located adjacent the first cluster 902, a second port 914 is located adjacent the second cluster 904 and a third port 916 is located adjacent the dwelling 906. The first port 912 is provided to enable transfer of transporting vessels between the first cluster 902 and the conduit network 910. Similarly, the second port 914 is provided to enable transfer of transporting vessels between the second cluster 904 and the conduit network 910. Likewise, the third port 916 is provided to enable transfer of transporting vessels between the dwelling 906 and the conduit network 910.

In this example, the conduit network 910 employs a locomotion technique compatible with the locomotion technique employed by the first cluster 902 and the second cluster 914. Similarly, the dwelling employs a receiving locomotion system compatible with the locomotion system employed by the conduit network 910. The conduit network 900 comprises a distribution control system (not shown).

It should be appreciated that a greater or fewer number of clusters can be deployed and at locations of varying distances therebetween. The system can be employed in a CFC and/or the first and second clusters 902, 904 can constitute CFCs and/or form part of a larger CFC or warehouse or fulfilment centre in an online retail system. Of course, the distribution system 900 can comprise a greater number of dwellings.

In operation, the conduit network 910 cooperates with the motion control system 302 referred to above of the object handling coordination system in order to coordinate insertion, for example, of a transporting vessel 104 relocatable within a cluster and disposed, in this example, at an internal start location within the cluster, into the network conduit 910, for example from the first cluster 902 via the first port 912. The distribution control system 900 then directs and conveys the transporting vessel 104 from the first port 912 to an ultimate destination, for example the dwelling 906.

Upon arrival of the transporting vessel 104 at the dwelling 906, the receiving locomotion system cooperates with the distribution control system to receive the transporting vessel 104, for example by raising the transporting vessel 104 out of the conduit network 910 and into the dwelling 906. It should of course be appreciated that the transporting vessel 104 can make a journey, for example a reverse journey, from the dwelling 906 to the first cluster 902 or the second cluster 904, for example including insertion of the relocatable transporting vessel 104 into the conduit network 910.

In some embodiments, different computing architectures can be employed, for example the servers employed can be implemented on a 'cloud computing' type platform for distributed computing. Likewise, any embodiments and implementations set forth herein in the context of the cloud can similarly be implemented on one or more local servers, a single remote server, a software as a service platform, or any other computing device can be used instead of the cloud. Indeed, the present system and method can be practiced on virtually any manner of computer device including a desktop computer, laptop computer, tablet computer or wireless handheld.

It will further be appreciated that whilst the system described above is in the context of transporting vessels traversing a cluster, the above technique can be applied to any number of systems where a number of moveable items need to be moved across a volume, for example but not exclusively, a three-dimensional structure without interference in as simple yet quick manner as possible. It should also be appreciated that although the above examples have been described in the context of relocation of one or more transporting vessels within the cluster, the term "within" is intended to embrace relocation of one or more transporting vessels at a peripheral surface of the cluster.

The present system and method can also be implemented as a computer-readable/useable medium that includes computer program code to enable one or more computer devices to implement each of the various process steps in a method in accordance with the present invention. In cases of more than one computer device performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage partitions of a computing device, such as memory associated with a computer and/or a storage system.

The invention claimed is:

1. An object handling coordination system, comprising:
   a plurality of transporting vessels arranged as a three-dimensional cluster of transporting vessels, the plurality of transporting vessels being respectively addressable and the cluster having a self-reconfigurable physical topology;
   a relocatable transporting vessel of the plurality of transporting vessels configured to be relocatable within the cluster in response to an instruction; and
   a processing resource configured to support a motion control system; wherein:
   the motion control system is configured to determine a path from a start location of the relocatable transporting vessel within the cluster to a destination location within the cluster; and
   the motion control system is configured to execute movement of the relocatable transporting vessel within the cluster using the determined path,
   wherein the motion control system is arranged to:
      notionally sub-divide the cluster into plural regions; and
      for the region of the cluster in which the start location of the relocatable transporting vessel and the destination location are located:
         receive initial state data from one of more of the plurality of transporting vessels within the region;
         receive one or more goals to relocate the relocatable transporting vessel from the start location to the destination location, wherein the goal requests whether to leave a given location within the cluster empty or occupied by one of the plurality of transporting vessels; and
         perform a search to determine possible sequences of states that can be implemented to relocate the relocatable transporting vessel from the start location to the destination location.

2. A system as claimed in claim 1, wherein the motion control system is configured to address a number of the plurality of the transporting vessels and provide respective instructions thereto in order to affect translation of the relocatable transporting vessel within the cluster in accordance with the determined path.

3. A system as claimed in claim 2, wherein the number of the plurality of transporting vessels comprises:
   the relocatable transporting vessel.

4. A system as claimed in claim 1, wherein the relocatable transporting vessel is configured to translate laterally within the cluster.

5. A system as claimed in claim 1, wherein the motion control system is configured to calculate the path between the start location and the destination location so as to satisfy a predetermined metric.

6. A system as claimed in claim 5, wherein the metric is a cost function.

7. A system as claimed in claim 1, wherein each of the plurality of transporting vessels is independently addressable.

8. A system as claimed in claim 1, wherein the plurality of transporting vessels is configured to receive a respective motion control instruction.

9. A system as claimed in claim 1, wherein the relocatable transporting vessel is driven from within the cluster.

10. A system as claimed in claim 1, wherein the motion control system is configured to determine the path by determining an internal physical sub-topology of the cluster to support the translation of the relocatable transporting vessel.

11. A system as claimed in claim 10, wherein the motion control system is configured to identify a set of the plurality of transporting vessels to provide the internal physical sub-topology of the cluster.

12. A system as claimed in claim 11, wherein the motion control system is configured to determine a sequence of moves of the set of the plurality of transporting vessels in order to provide the internal physical sub-topology.

13. A system as claimed in claim 1, comprising:
another relocatable transporting vessel of the plurality of transporting vessels configured to be relocatable within the cluster in response to another instruction; wherein:
the motion control system is configured to determine another path from another start location of the other relocatable transporting vessel within the cluster to another destination location within the cluster; and
the motion control system is configured to execute movement of the other relocatable transporting vessel within the cluster using the determined other path.

14. A system as claimed in claim 1, wherein the motion control system is configured to determine a plurality of sequences of states in respect of at least part of the cluster and corresponding to a tree of states having a predetermined depth.

15. A system as claimed in claim 14, wherein the motion control system is configured to analyse the plurality of sequences of states and to calculate a cost in respect of each sequence of states of the plurality of sequence of states.

16. A method of relocating a transporting vessel within a plurality of transporting vessels arranged as a three-dimensional cluster of transporting vessels, the plurality of transporting vessels being respectively addressable and the cluster having a self-reconfigurable physical topology, the method comprising:
determining a path from a start location of a relocatable transporting vessel within the cluster to a destination location within the cluster via a motion control system; and
executing movement of the relocatable transporting vessel within the cluster using the determined path;
notionally sub-dividing the cluster into regions;
for the region of the cluster in which the start location of the relocatable transporting vessel and the destination location are located:
receiving initial state data from one or more of the plurality of transporting vessels within the region;
receiving one or more goals to relocate the relocatable transporting vessel from the start location to the destination location, wherein the goal requests whether to leave a given location within the cluster empty or occupied by one of the plurality of transporting vessels; and
performing a search to determine possible sequences of states that can be implemented to relocate the relocatable transporting vessel from the start location to the destination location.

* * * * *